(12) United States Patent
Ramakrishnan et al.

(10) Patent No.: US 9,905,254 B1
(45) Date of Patent: Feb. 27, 2018

(54) BOND PAD SHARING FOR POWERING MULTIPLE COMPONENTS OF A RECORDING HEAD

(71) Applicant: Seagate Technology LLC, Cupertino, CA (US)

(72) Inventors: Narayanan Ramakrishnan, Eden Prairie, MN (US); Declan Macken, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/414,234

(22) Filed: Jan. 24, 2017

Related U.S. Application Data

(60) Provisional application No. 62/293,201, filed on Feb. 9, 2016.

(51) Int. Cl.
| | |
|---|---|
| G11B 5/48 | (2006.01) |
| G11B 5/31 | (2006.01) |
| G11B 5/60 | (2006.01) |
| G11B 5/39 | (2006.01) |
| G11B 5/00 | (2006.01) |

(52) U.S. Cl.
CPC ............ *G11B 5/4853* (2013.01); *G11B 5/314* (2013.01); *G11B 5/3133* (2013.01); *G11B 5/397* (2013.01); *G11B 5/607* (2013.01); *G11B 5/6076* (2013.01); *G11B 2005/0021* (2013.01)

(58) Field of Classification Search
None
See application file for complete search history.

(56) References Cited

U.S. PATENT DOCUMENTS

| | | |
|---|---|---|
| 4,914,398 A | 4/1990 | Jove et al. |
| 5,298,641 A | 3/1994 | Stewen |
| 5,494,473 A | 2/1996 | Dupuis et al. |
| 5,527,110 A | 6/1996 | Abraham et al. |
| 5,610,783 A | 3/1997 | Maffitt et al. |
| 5,712,747 A | 1/1998 | Voldman et al. |
| 5,748,412 A | 5/1998 | Murdock et al. |
| 5,768,068 A | 6/1998 | Eckberg et al. |
| 5,850,374 A | 12/1998 | Abraham et al. |

(Continued)

OTHER PUBLICATIONS

U.S. Appl. No. 15/196,549, filed Jun. 29, 2016, Macken et al.
U.S. Appl. No. 15/415,165, filed Jan. 25, 2017, Ramakrishnan et al.

*Primary Examiner* — Craig A. Renner
(74) *Attorney, Agent, or Firm* — Hollingsworth Davis, LLC

(57) ABSTRACT

A slider of a magnetic recording head includes a ground pad and a plurality of electrical bond pads coupled to bias sources. The plurality of electrical bond pads includes a plurality of shared bond pads. A first component of the slider is coupled to a first bond pad and one of the shared bond pads. The slider includes one or more additional components each coupled to a respective pair of the shared bond pads. A first ground-coupled component of the slider is coupled between one of the shared bond pads and the ground pad. A first diode is disposed on the slider and coupled in series with the first ground-coupled component. A first Zener diode can be disposed on the slider and coupled between the first diode and the ground pad for enhanced ground noise immunity of the powered devices.

25 Claims, 29 Drawing Sheets

(56) References Cited

U.S. PATENT DOCUMENTS

| | | | |
|---|---|---|---|
| 5,896,249 A | 4/1999 | Fontana, Jr. et al. |
| 6,034,849 A | 3/2000 | Takizawa |
| 6,052,249 A | 4/2000 | Abraham et al. |
| 6,347,983 B1 | 2/2002 | Hao et al. |
| 6,396,667 B1 | 5/2002 | Zhang et al. |
| 6,623,330 B2 | 9/2003 | Fukuroi |
| 6,813,118 B2 | 11/2004 | Pust et al. |
| 7,088,543 B2 | 8/2006 | Satoh et al. |
| 7,119,990 B2 | 10/2006 | Bajorek et al. |
| 7,133,254 B2 | 11/2006 | Hamann et al. |
| 7,362,534 B1 | 4/2008 | Schreck et al. |
| 7,446,977 B2 | 11/2008 | Nikitin et al. |
| 7,466,516 B2 | 12/2008 | Lille |
| 7,551,406 B1 | 6/2009 | Thomas et al. |
| 7,589,936 B1 | 9/2009 | McFadyen et al. |
| 7,643,250 B2 | 1/2010 | Araki et al. |
| 7,782,568 B2 | 8/2010 | Shiraki et al. |
| 7,936,538 B1 | 5/2011 | Zhang et al. |
| 7,969,687 B2 | 6/2011 | Lee et al. |
| 8,098,450 B2 | 1/2012 | Baumgart et al. |
| 8,159,780 B2 | 4/2012 | Brand |
| 8,169,751 B2 | 5/2012 | Albrecht et al. |
| 8,297,113 B2 | 10/2012 | Liners et al. |
| 8,310,779 B2 | 11/2012 | Hanchi et al. |
| 8,400,736 B2 | 3/2013 | Greminger et al. |
| 8,432,636 B2 | 4/2013 | Brand |
| 8,804,272 B1 | 8/2014 | Dakroub et al. |
| 8,879,189 B2 | 11/2014 | Miyamoto et al. |
| 8,937,791 B1 | 1/2015 | Olson et al. |
| 8,947,807 B2 | 2/2015 | Heim et al. |
| 8,953,275 B2 | 2/2015 | Chou et al. |
| 9,111,572 B2 | 8/2015 | Kunkel et al. |
| 9,607,640 B2 | 3/2017 | Macken et al. |
| 9,607,641 B1 * | 3/2017 | Ramakrishnan et al. ............ G11B 5/6005 |
| 2005/0024775 A1 | 2/2005 | Kurita et al. |
| 2005/0190495 A1 | 9/2005 | Lille |
| 2005/0213250 A1 * | 9/2005 | Kurita et al. ......... G11B 5/6005 360/234.4 |
| 2006/0056110 A1 | 3/2006 | Kato et al. |
| 2006/0203387 A1 | 9/2006 | White et al. |
| 2007/0035881 A1 | 5/2007 | Burbank et al. |
| 2007/0230056 A1 | 10/2007 | Beach et al. |
| 2007/0274005 A1 | 11/2007 | Zhu et al. |
| 2008/0074797 A1 * | 3/2008 | Ikai et al. ............. G11B 5/4853 360/294.4 |
| 2009/0040645 A1 | 2/2009 | Shimazawa et al. |
| 2009/0052076 A1 | 2/2009 | Shimazawa et al. |
| 2009/0052077 A1 | 2/2009 | Tanaka et al. |
| 2009/0195930 A1 | 8/2009 | Lille |
| 2009/0251821 A1 | 10/2009 | Song et al. |
| 2009/0262460 A1 | 10/2009 | Hanchi et al. |
| 2010/0226044 A1 | 9/2010 | Iwase |
| 2011/0013316 A1 * | 1/2011 | Brand .................. G11B 5/3133 360/110 |
| 2011/0019311 A1 | 1/2011 | Greminger et al. |
| 2011/0248167 A1 | 10/2011 | Gurvitch et al. |
| 2012/0113207 A1 | 5/2012 | Zheng |
| 2012/0120519 A1 | 5/2012 | Kunkel et al. |
| 2012/0120522 A1 | 5/2012 | Johnson et al. |
| 2012/0120527 A1 | 5/2012 | Kunkel et al. |
| 2012/0327529 A1 | 12/2012 | Hutchinson et al. |
| 2013/0188273 A1 | 7/2013 | Miyamoto et al. |
| 2013/0314817 A1 * | 11/2013 | Otsuki .................. G11B 5/486 360/86 |
| 2014/0160906 A1 * | 6/2014 | Yamada ............... G11B 5/4853 360/244.1 |
| 2014/0177083 A1 | 6/2014 | Heim et al. |
| 2014/0269838 A1 | 9/2014 | Macken |
| 2015/0103430 A1 * | 4/2015 | Gadbois et al. ...... G11B 5/4853 360/59 |
| 2015/0380021 A1 | 12/2015 | Kunkel et al. |
| 2017/0032810 A1 * | 2/2017 | Macken et al. ....... G11B 5/4853 |

* cited by examiner

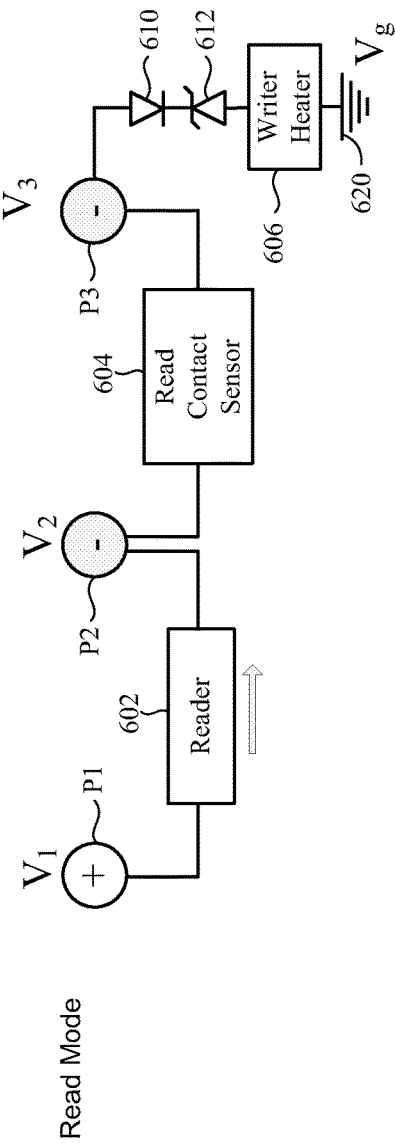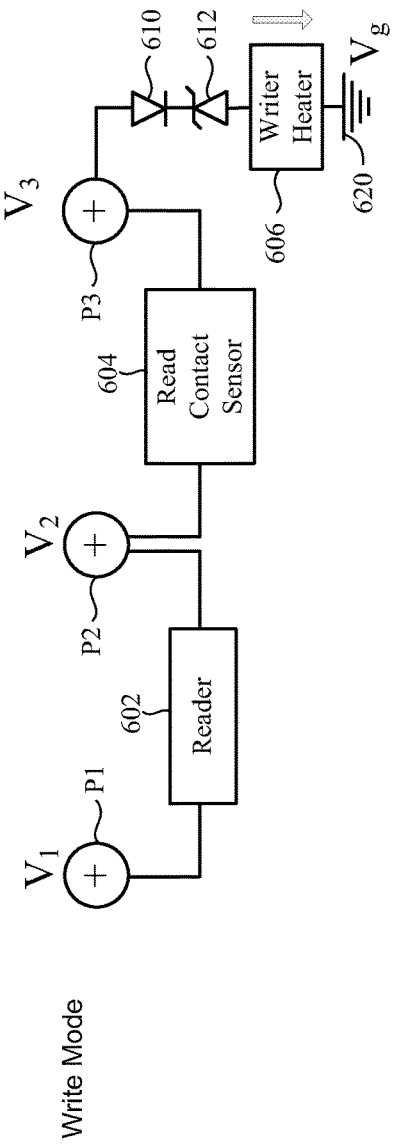

Head-Medium/Asperity
Contact Detection Mode

Read Mode

Read Mode

Write Mode

Read Mode

Head-Medium/Asperity
Contact Detection Mode

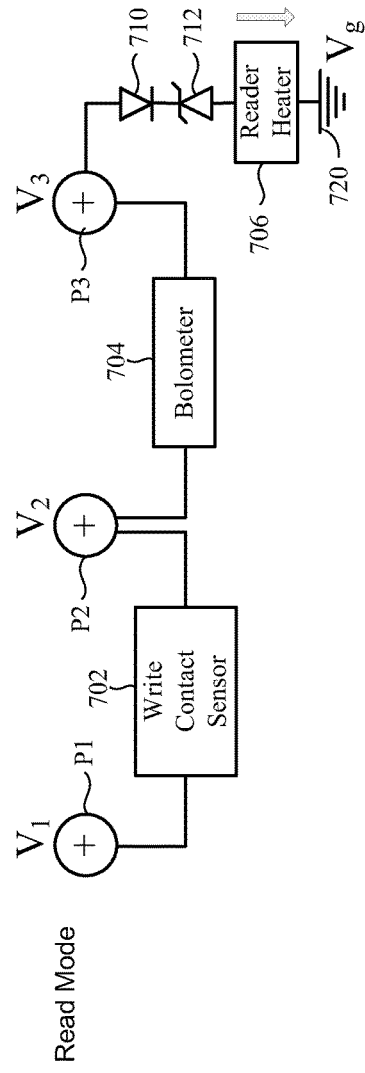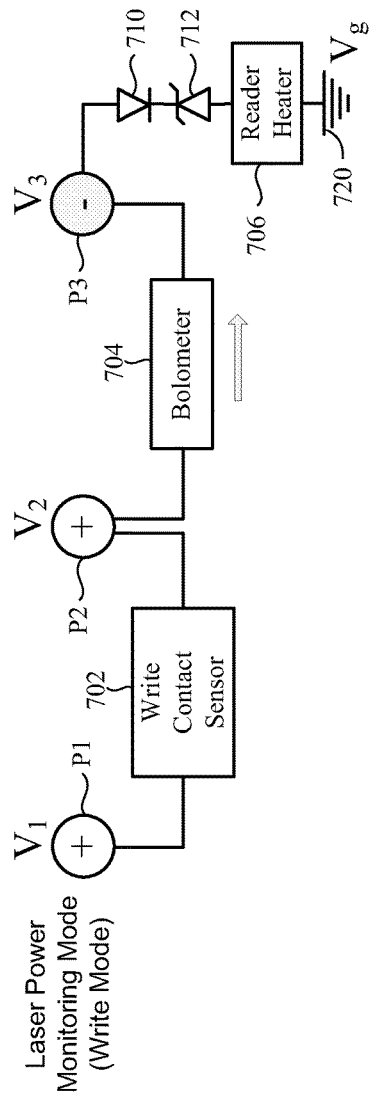

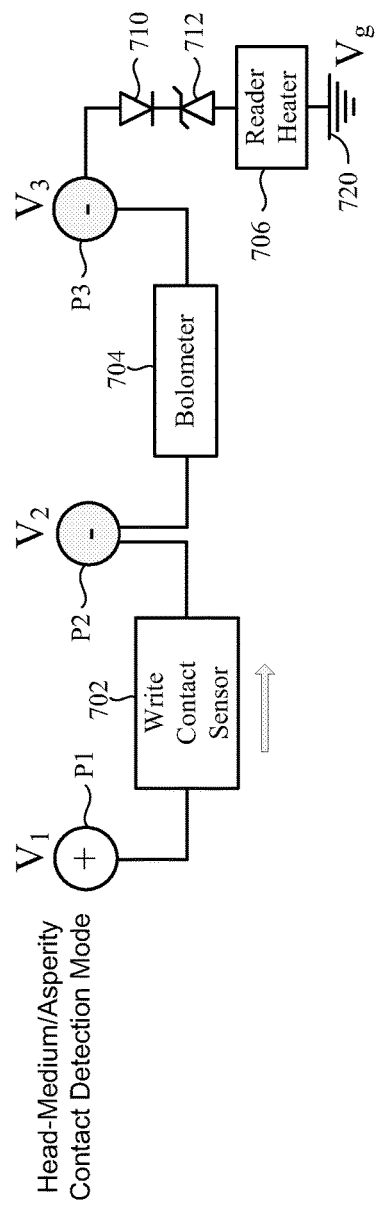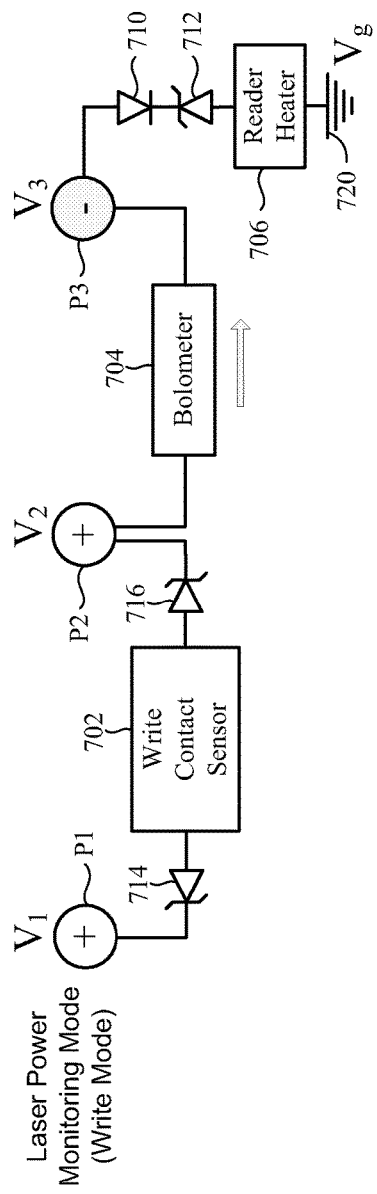

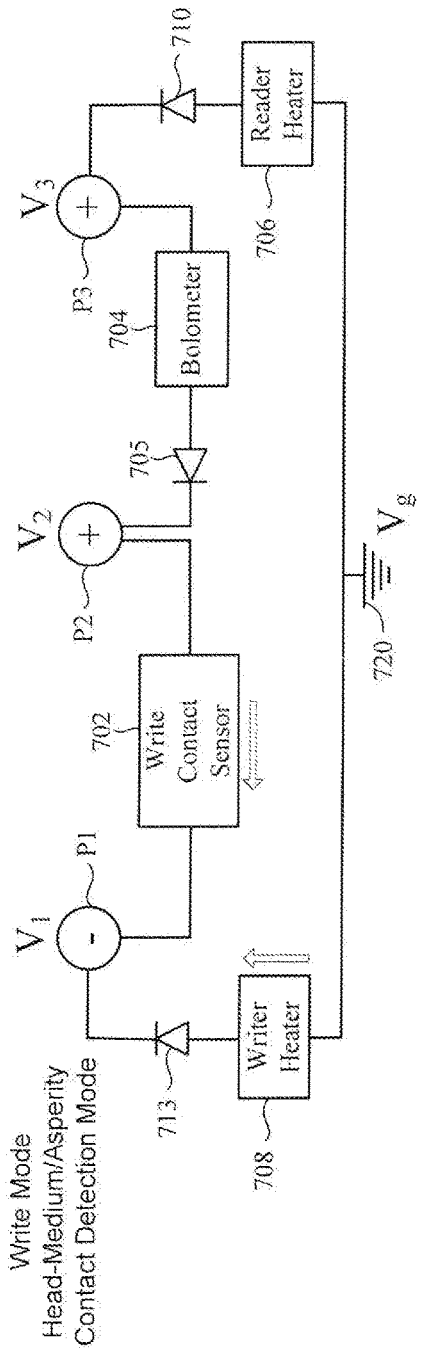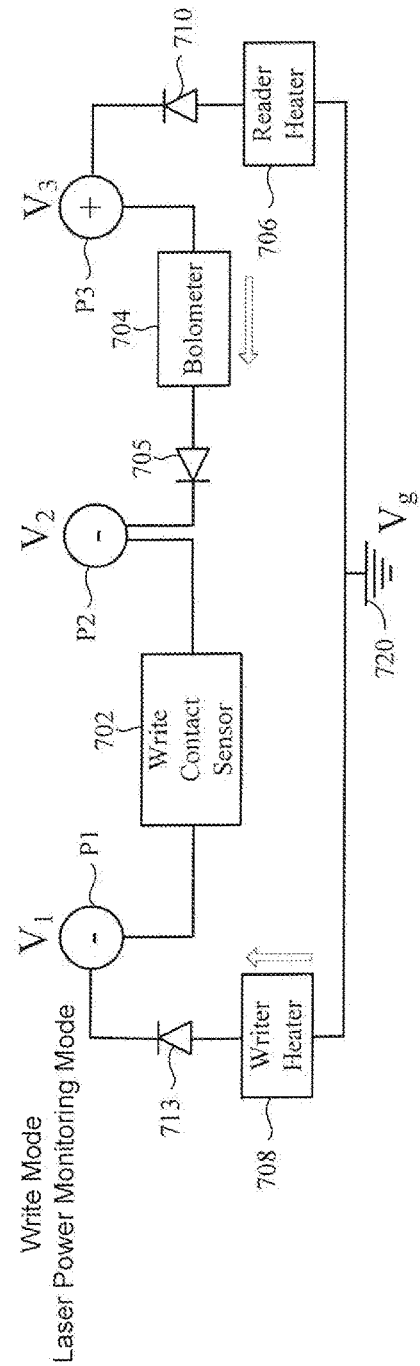

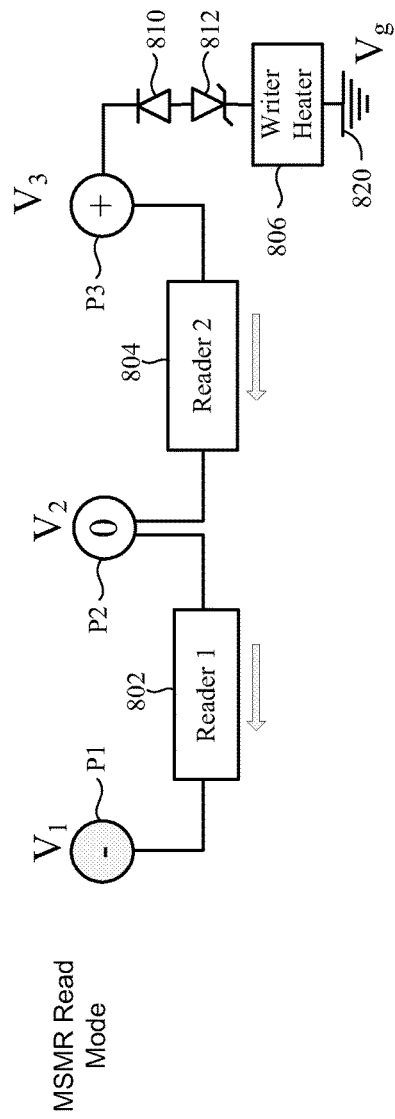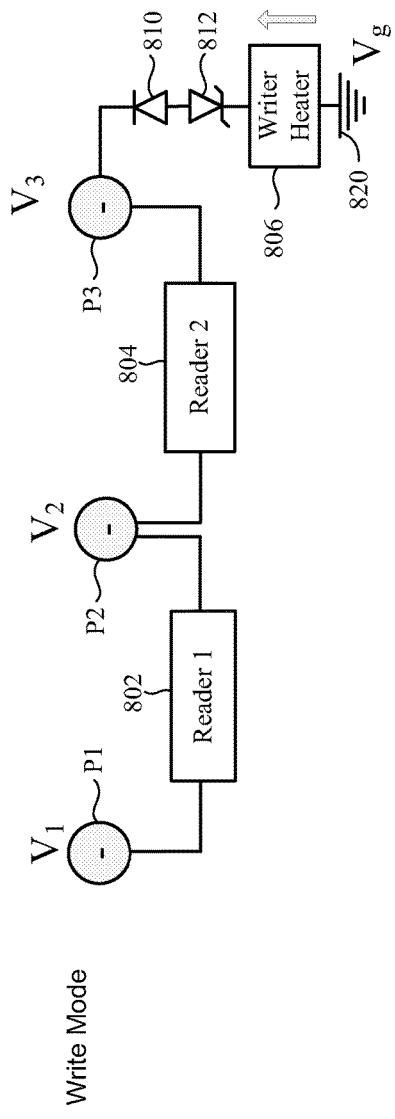

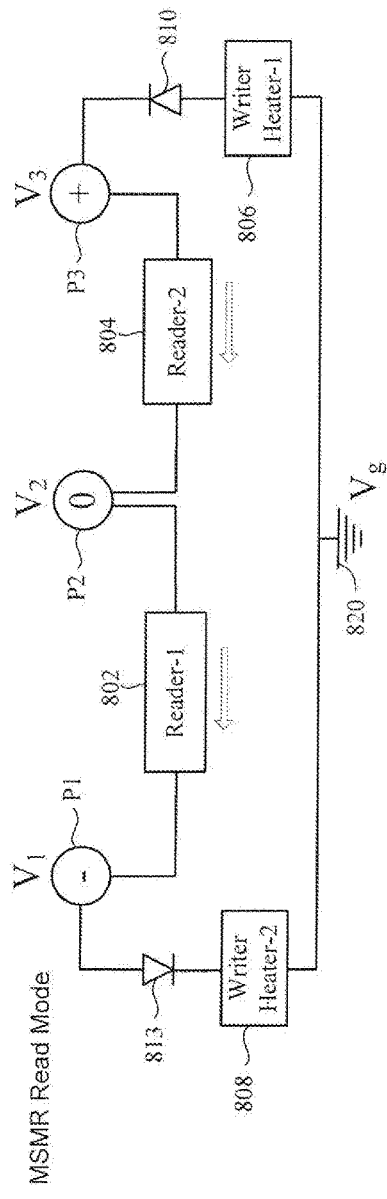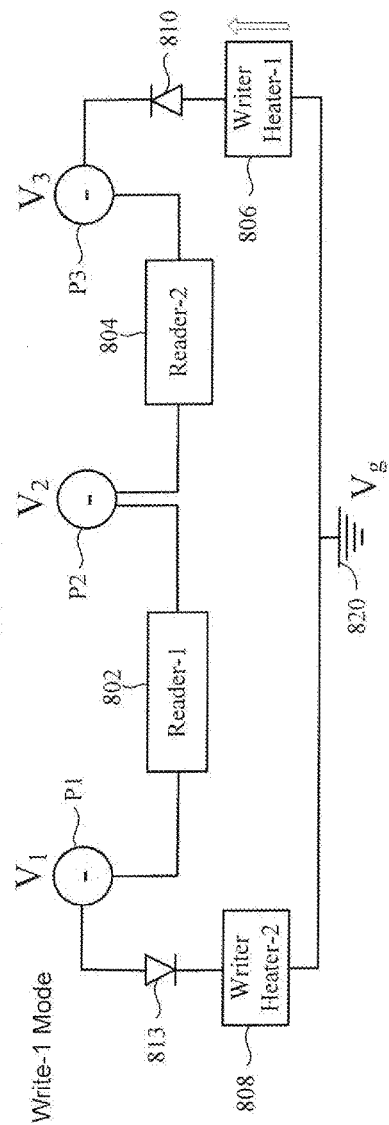

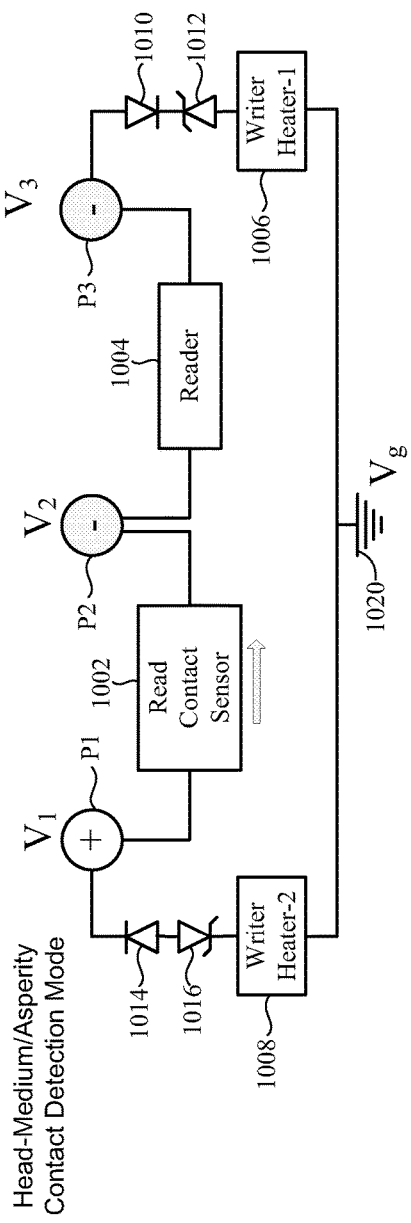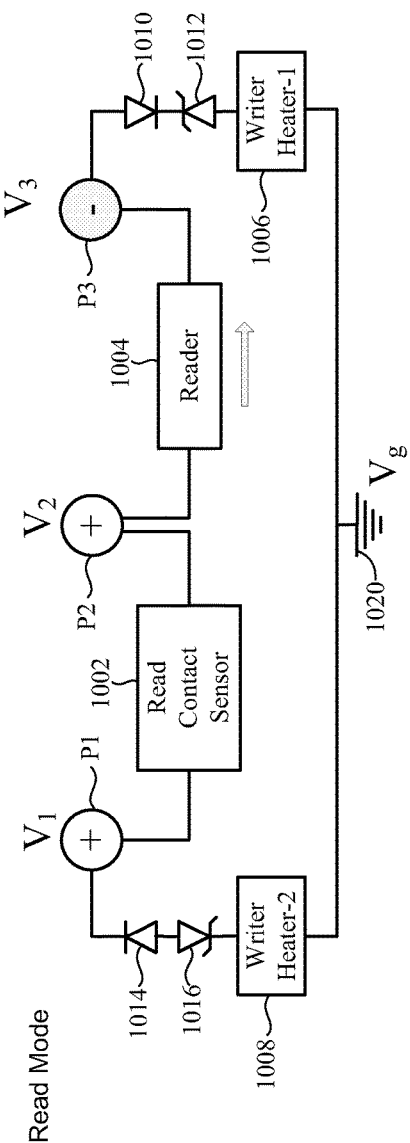

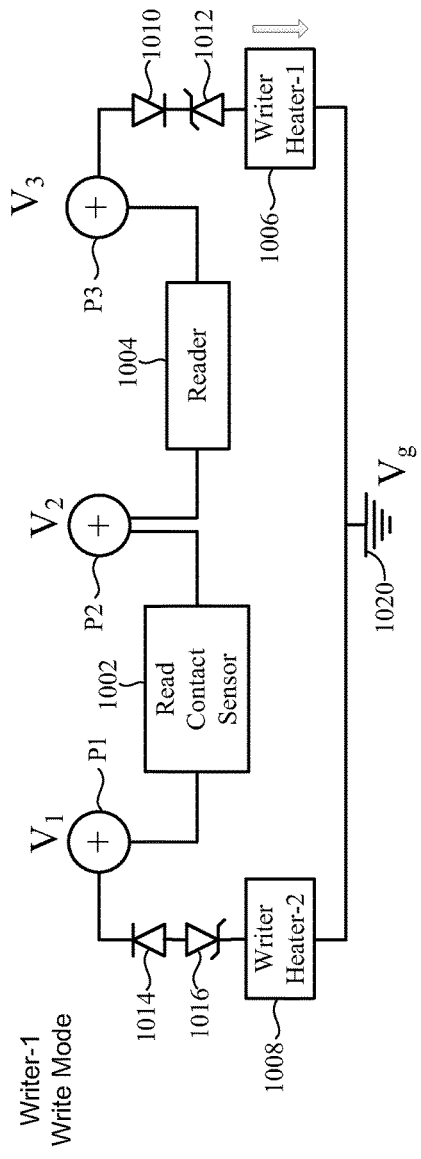
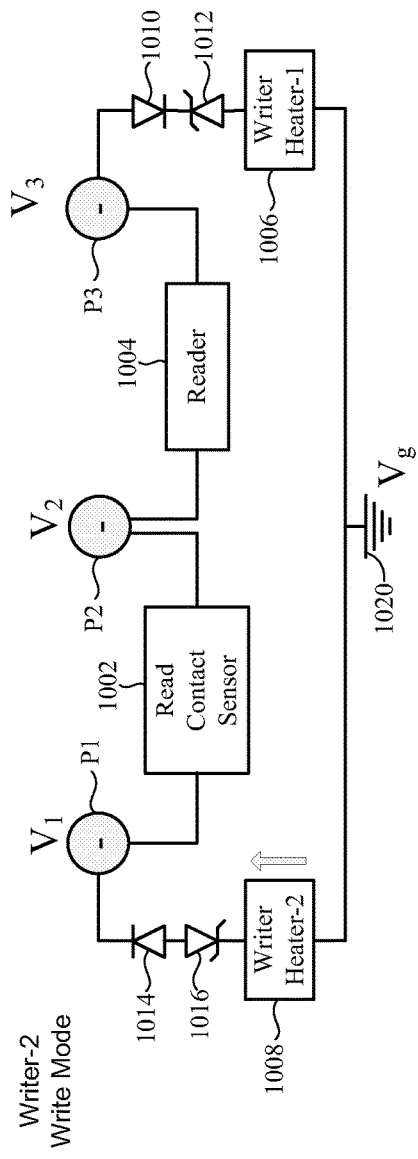

Read Mode

Write-2 Mode
Head-Medium/Asperity
Contact Detection Mode

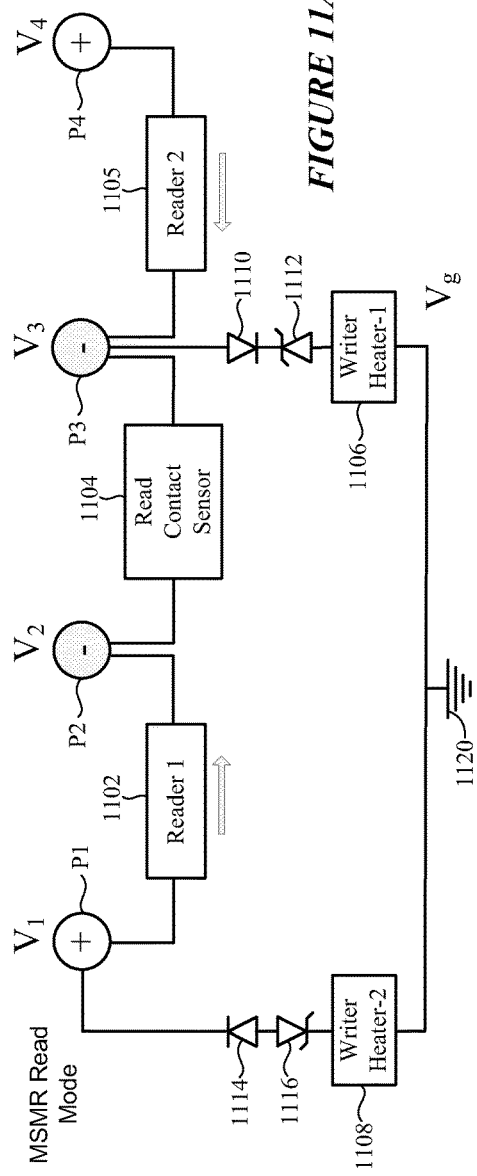
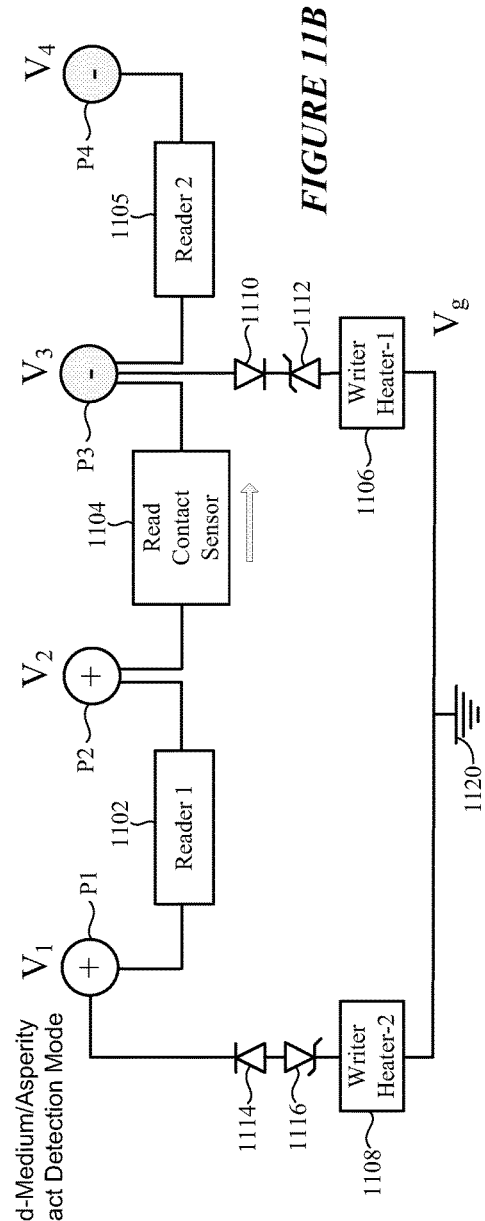

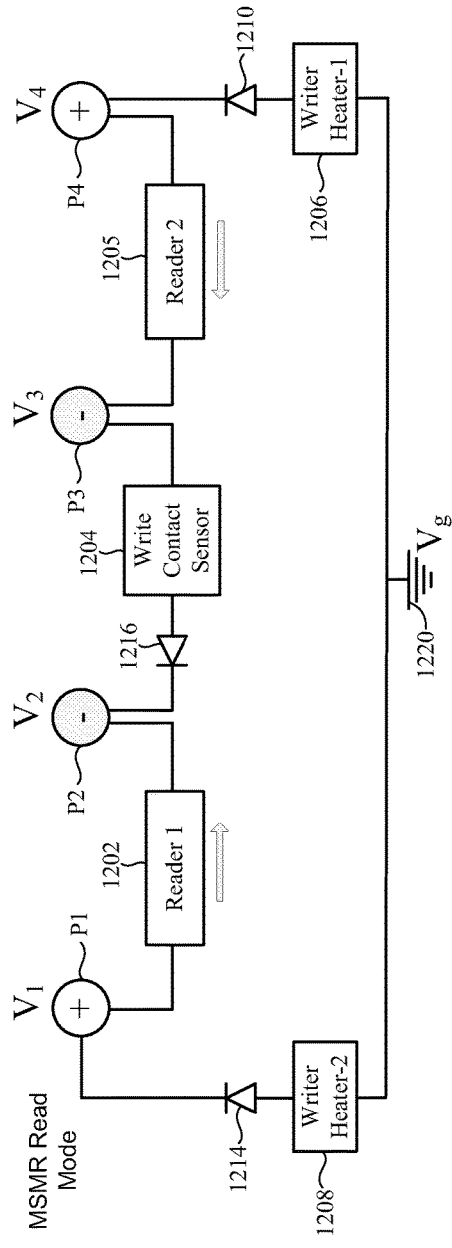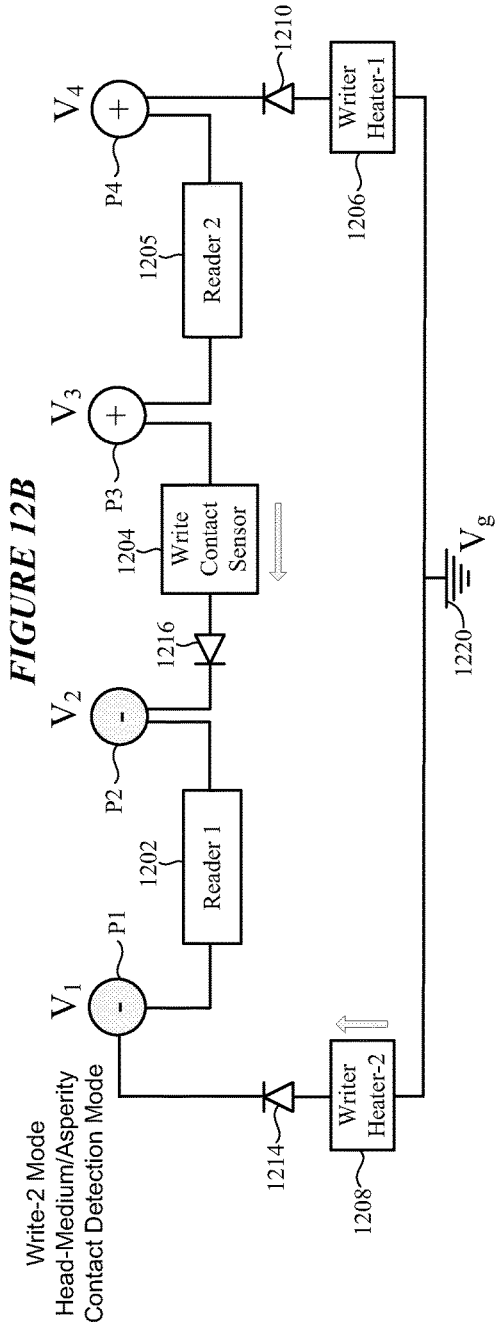

BOND PAD SHARING FOR POWERING MULTIPLE COMPONENTS OF A RECORDING HEAD

RELATED PATENT DOCUMENTS

This application claims the benefit of Provisional Patent Application Ser. No. 62/293,201 filed on Feb. 9, 2016, to which priority is claimed pursuant to 35 U.S.C. § 119(e), and which is incorporated herein by reference in its entirety.

SUMMARY

Various embodiments are directed to an apparatus which includes a slider of a magnetic recording head comprising a ground pad and a plurality of electrical bond pads coupled to bias sources. The plurality of electrical bond pads includes a plurality of shared bond pads. A first component of the slider is coupled to a first bond pad and one of the shared bond pads. The slider includes one or more additional components each coupled to a respective pair of the shared bond pads. A first ground-coupled component of the slider is coupled between one of the shared bond pads and the ground pad. A first diode is disposed on the slider and coupled in series with the first ground-coupled component. In some embodiments, a first Zener diode is disposed on the slider and coupled between the first diode and the ground pad.

Other embodiments are directed to an apparatus which includes a slider of a magnetic recording head comprising a ground pad and a plurality of electrical bond pads coupled to bias sources. The plurality of electrical bond pads includes a plurality of shared bond pads. A first reader of the slider is coupled to a first bond pad and one of the shared bond pads. A second reader of the slider is coupled to a pair of the shared bond pads. A first writer heater of the slider is coupled between one of the shared bond pads and the ground pad. A first diode is disposed on the slider and coupled in series with the first writer heater. In some embodiments, a first Zener diode is disposed on the slider and coupled between the first diode and the ground pad.

Some embodiments are directed to an apparatus which includes a slider of a magnetic recording head comprising a ground pad and a plurality of electrical bond pads coupled to bias sources. The plurality of electrical bond pads includes a plurality of shared bond pads. A reader of the slider is coupled between a first bond pad and one of the shared bond pads. A contact sensor of the slider is coupled to a pair of the shared bond pads. A writer heater of the slider is coupled between one of the shared bond pads and the ground pad. A diode is disposed on the slider and coupled in series with the writer heater. In some embodiments, a Zener diode is disposed on the slider and coupled between the diode and the ground pad.

Further embodiments are directed to an apparatus which includes a slider of a magnetic recording head comprising a ground pad and a plurality of electrical bond pads coupled to bias sources. The plurality of electrical bond pads includes a plurality of shared bond pads. A first component of the slider is coupled to a first bond pad and one of the shared bond pads. The slider includes one or more additional components each coupled to a respective pair of the shared bond pads. A first ground-coupled component of the slider is coupled between one of the shared bond pads and the ground pad. A switching transistor is coupled to one of the additional components, the first ground-coupled component, and the ground pad. The switching transistor is arranged to control powering of the first ground-coupled component in response to biasing of the one of the additional components.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIGS. 6A, 6B, 6C, 6D, 6E, and 6F illustrate circuits that support bond pad sharing between a multiplicity of slider components including a reader, a contact sensor, and a writer heater in accordance with various embodiments;

FIGS. 7A, 7B, 7C, and 7D illustrate circuits that support bond pad sharing between a multiplicity of slider components including a contact sensor, a bolometer, and a reader heater in accordance with various embodiments;

FIGS. 7E, 7F, and 7G illustrate circuits that support bond pad sharing between a multiplicity of slider components including a contact sensor, a bolometer, a reader heater, and a writer heater in accordance with various embodiments;

FIGS. 8A and 8B illustrate circuits that support bond pad sharing between a multiplicity of readers and a writer heater in accordance with various embodiments;

FIGS. 8C, 8D, and 8E illustrate circuits that support bond pad sharing between a multiplicity of readers and a multiplicity of writer heaters in accordance with various embodiments;

FIGS. 10A, 10B, 10C, 10D, and 10E illustrate circuits that support bond pad sharing between a multiplicity of slider components including a contact sensor, a reader, a first writer heater, and a second writer heater in accordance with various embodiments;

FIGS. 11A, 11B, 11C, 11D, and 11E illustrate circuits that support bond pad sharing between a multiplicity of slider components including a first reader, a contact sensor, a second reader, a first writer heater, and a second writer heater in accordance with various embodiments; and FIGS. 12A, 12B, and 12C illustrate circuits that support bond pad sharing between a multiplicity of slider components including a contact sensor, a first reader, a second reader, a first writer heater, and a second writer heater in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include one or more readers, one or more reader heaters, one or more writers, and one or more writer heaters, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

Figure 1:
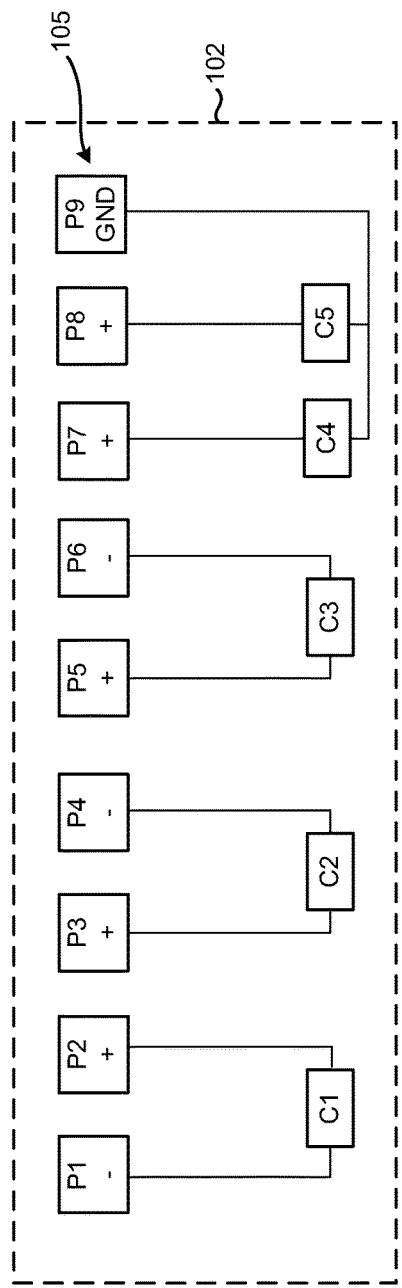
FIG. 1 illustrates an embodiment of a recording transducer that does not utilize pad sharing.
Figure 2:
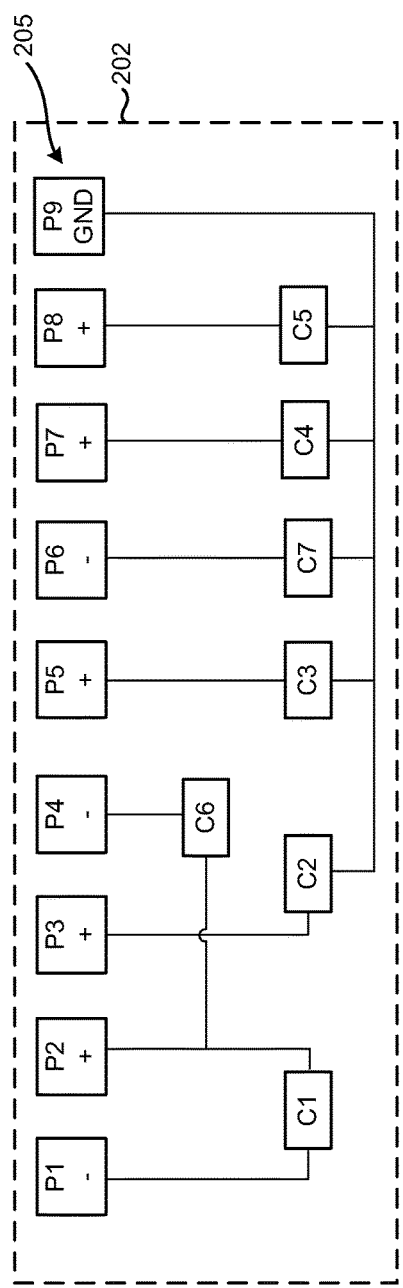
FIG. 2 illustrates a recording transducer that utilizes pad sharing according to embodiments of the present disclosure.

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9, also referred to herein simply as ground). The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 105 of bond pads (P1-P9). As previously discussed, the set 205 of bond pads is the same as the bond pad set 105 shown in FIG. 1 (i.e., 8 electrical bond pads and 1 ground pad). In contrast to the slider 102 illustrated in FIG. 1 which supports five electrical components using eight electrical bond pads, the slider 202 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

The need for sharing of electrical bond pads has intensified in the advent of recording heads configured for heat-assisted magnetic recording, also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

Figure 3:
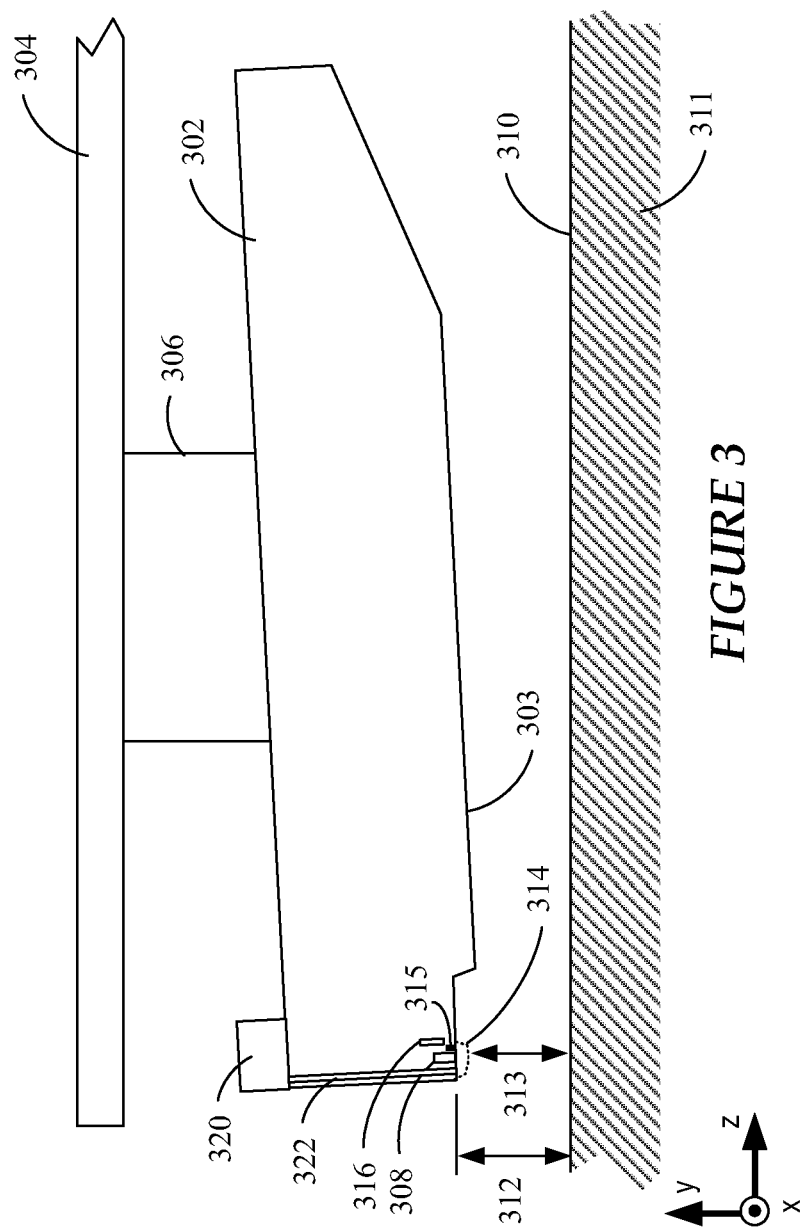
FIG. 3 shows a side view of a read/write transducer configured for heat-assisted magnetic recording (HAMR) according to a representative embodiment.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
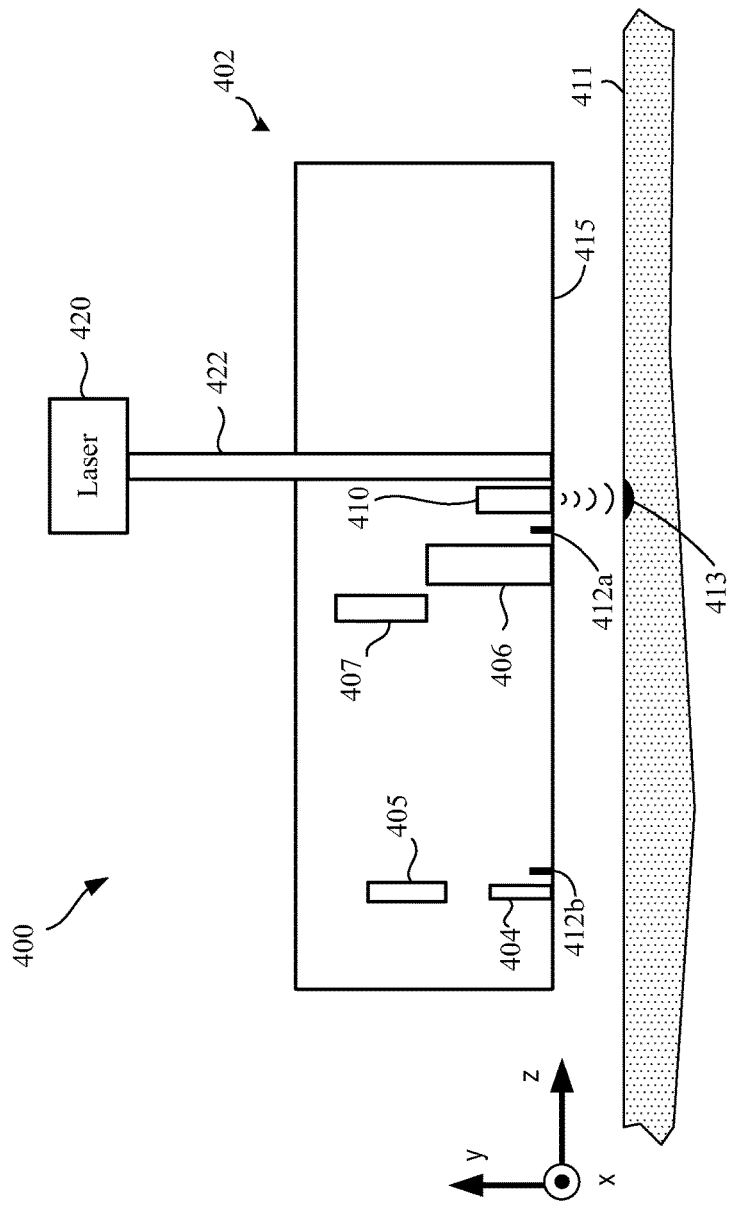
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a reader 404 and a writer 406 proximate the ABS 415 for respectively reading and writing data from/to the magnetic medium 411. The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the reader 404 includes a corresponding heater 405 according to various embodiments. The writer heater 407 can be powered to cause protrusion of the ABS 415 predominately in the ABS region at or proximate the writer 406, and the reader heater 405 can be powered to cause protrusion of the ABS 415 predominately in the ABS region at or proximate the reader 404. Power can be controllably delivered independently to the heaters 407 and 405 to adjust the fly height (e.g., clearance) of the slider 402 relative to the surface of the recording medium 411. One or more thermal sensors 412a, 412b can be situated at various locations on the slider 402 at or near the ABS 415 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 gets absorbed by the magnetic medium 411, thereby raising the temperature of the spot 413 on the medium 411 as data is being recorded.

Sharing of electrical bond pads is important for magnetic recording heads configured for interlaced magnetic recording, also referred to as interleaved magnetic recording. Recording heads configured for IMR include two writers in addition to one or more readers. One of the writers is wide and the other writer is narrow. Each of the two writers has an associated writer heater. The addition of a second writer and a second heater for thermally actuating the second writer increases the demand for additional bond pads. Embodiments are directed to bond pad sharing for recording heads configured for IMR. Some embodiments are directed to bond pad sharing for recording heads configured for both IMR and HAMR.

Figure 5:
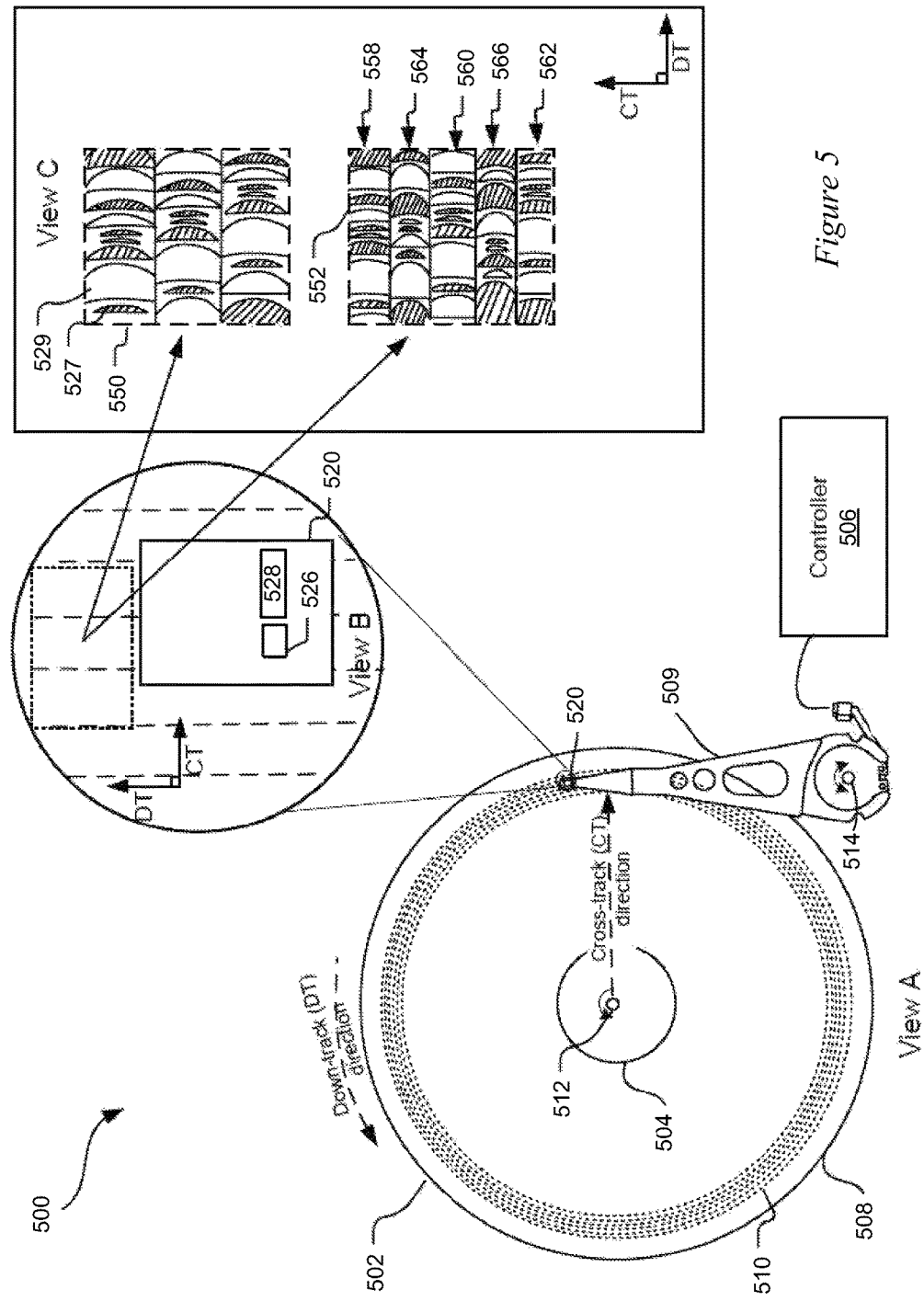
FIG. 5 shows a recording transducer and magnetic recording medium configured to implement interlaced magnetic recording (IMR) in accordance with various embodiments.

FIG. 5 illustrates a data storage device 500 including a recording head 520 for writing data on a magnetic storage medium 508 in accordance with an interlaced magnetic recording methodology. As illustrated in View A of FIG. 5, the storage medium 508 rotates about a spindle center or a disk axis of rotation 512 during rotation, and includes an inner diameter 504 and an outer diameter 502 between which are a number of concentric data tracks 510. Information may be written to and read from data bit locations in the data tracks on the storage medium 508. The recording head 520 is mounted on an actuator assembly 509 at an end distal to an actuator axis of rotation 514. The recording head 520 flies in close proximity above the surface of the storage medium 508 during disk rotation. A seek operation positions the recording head 520 over a target data track for read and write operations.

Referring to View B of FIG. 5, the recording head 520 includes two different writers 526 and 528, also referred to as write elements. The writers 526 and 528 are shown to be in alignment in the cross-track direction; however, other write element configurations are contemplated for use in other implementations. Each of the writers 526 and 528 includes a write pole (not shown) that converts a series of electrical pulses sent from a controller 506 into a series of magnetic pulses of commensurate magnitude and length, and the magnetic pulses selectively magnetize magnetic grains of the rotating magnetic media 508 as they pass below the write element 526 or 528.

View C of FIG. 5 illustrates magnified views 550 and 552 of a same surface portion of the storage media 508 according to different write methodologies and settings of the storage device 500. Specifically, the magnified views 550 and 552 include a number of magnetically polarized regions, also referred to herein as "data bits," along the data tracks of the storage media 508. Each of the data bits (e.g., a data bit 527) represents one or more individual data bits of a same state (e.g., 1s or 0s). For example, the data bit 529 is a magnetically polarized region representing multiple bits of a first state (e.g., "000"), while the adjacent data bit 527 is an oppositely polarized region representing one or more bits of a second state (e.g., a single "1"). The data bits in each of the magnified views 550, 552 are not necessarily illustrative of the actual shapes or separations of the bits within an individual system configuration.

The magnified view 550 in View C of FIG. 5 illustrates magnetic transitions recorded according to a conventional magnetic recording (CMR) technique. In a CMR system, all written data tracks are randomly writeable and of substantially equal width. A random write refers to a write operation to a first data track that does not critically impair (e.g., corrupt or erase) data on either adjacent track. According to one implementation, the recorded data bits of the magnified view 550 are recorded with a same write element (e.g., either the write element 526 or 528) of the recording head 520.

In a CMR system, an achievable linear density (e.g., density along an individual data track) is limited by the size of the write element used to write the data encoded on the storage medium 508. For example, the data bit 527 may represent the smallest data bit recordable by a particular write element. Likewise, a read element (not shown) may have difficulty deciphering the data recorded on the media 508 if the various polarized regions are too small or placed too close to one another.

The magnified view 552 illustrates data bits recorded according to another set of system parameters implementing an interlaced magnetic recording (IMR) technique. According to one implementation, this IMR technique provides for a higher total areal density capability (ADC) with a lower observable BER than conventional recording systems.

Specifically, the magnified view 552 illustrates alternating data tracks of different track widths and different linear densities. The write element 528 is used to write a first grouping of alternating data tracks (e.g., data tracks 558, 560, and 562) with a wide written track width, while the write element 526 is used to write a second grouping of interlaced data tracks (e.g., the data tracks 564, 566) with a narrower written track width. Data of the narrow, interlaced data tracks overwrites edges of adjacent and previously written data tracks of the wider width.

For example, writing of the data track 564 overwrites data on the adjacent edges of the data tracks 564 and 566. In other words, a defined track pitch (e.g., radial spacing between centers of two directly adjacent data tracks) is by design less than the write width of the wide write element 528 but greater than or approximately equal to the write width of the narrow write element 526.

In another implementation, the first grouping of data tracks (e.g., the data tracks 558, 560, and 562) includes data of a higher linear density than the interlaced tracks (e.g., the data tracks 564 and 566). Other implementations of the disclosed technology may provide for data tracks of three or more different written track widths and/or three or more different linear densities on a same surface of the magnetic storage medium 508.

To generate the IMR pattern shown in magnified view 552, a storage controller 506 of the storage device 500 alters one or more system parameters (e.g., write current, overshoot, waveform, etc.) based on a discrete write location where data is received and stored on the storage medium 508. For example, the storage controller 506 may write even-numbered data tracks on the storage medium 508 with a first linear density and track width and write odd-numbered data tracks on the magnetic media with a second linear density and different track width.

In one implementation, the storage medium 508 is divided radially into zones and each zone is associated with multiple linear densities. For example, two different linear densities may be used to write data of alternating tracks within each individual radial zone. The linear densities used in one radial zone may differ from the linear densities used in any other radial zone of the storage medium 508.

Further, the controller 506 may be configured to systematically direct incoming write commands to different data tracks of the storage medium according to a number of prioritized random access (PRA) rules. For example, the controller 506 selects storage locations for each incoming write command to systematically maximize a total number of possible random writes.

In general, PRA rules dictate an order in which two or more data tracks on the magnetic storage medium 508 are to be written. For example, a PRA rule may specify that a particular data track (center data track) is to be written before either of the data tracks adjacent to the particular data track. In this case, the particular data track is randomly writable if the adjacent data tracks do not contain any data.

If however, data is already stored on either of the adjacent data tracks, the data write to the particular data track may include: (1) caching the data on one or both of the adjacent data tracks; (2) writing the particular track; and (3) subsequently, re-writing the data of one or both of the adjacent data tracks. Embodiments that use IMR when writing data can be implemented according to the embodiments disclosed in commonly-owned, co-pending U.S. patent application Ser. No. 14/686,456, filed on Apr. 14, 2015, which claims benefit of priority to U.S. Provisional Application No. 62/083,696, filed on Nov. 24, 2014, and also to commonly-owned, co-pending U.S. patent application Ser. No. 14/686,561, filed on Apr. 14, 2015, which claims benefit of priority to U.S. Provisional Patent Application No. 62/083,732, filed on Nov. 24, 2014, all of which are hereby incorporated herein by reference.

Various embodiments of bond pad sharing by a multiplicity of components of a slider will now be described in greater detail. Some embodiments of the disclosure are directed to configurations that facilitate bond pad sharing between components of a slider configured for perpendicular magnetic recording (PMR). Other embodiments are directed to configurations that facilitate bond pad sharing between components of a slider configured for HAMR. Further embodiments are directed to configurations that facilitate bond pad sharing between components of a slider configured for two-dimensional magnetic recording (TDMR) and/or multi-signal magnetic recording (MSMR). Some embodiments are directed to configurations that facilitate bond pad sharing between components of a slider configured for IMR. Still other embodiments are directed to configurations that facilitate bond pad sharing between components of a slider configured for both IMR and TDMR/MSMR.

FIGS. 6A-6D illustrate circuits that support bond pad sharing between a multiplicity of components of a slider in accordance with various embodiments. In particular, FIGS. 6A-6D illustrate circuitry configured to facilitate bond pad sharing between a reader 602, a contact sensor 604, and a writer heater 606. The bond pad sharing arrangement shown in FIGS. 6A-6D is of particular usefulness in recording heads configured for perpendicular magnetic recording and HAMR.

In the circuitry shown in FIGS. 6A-6D, the writer heater 606 is configured to thermally actuate a writer of the slider, such as during a write operation or when setting clearance of the slider. The writer heater 606 is typically a resistive load, such as a metal wire. In the embodiment shown in FIGS. 6A-6D, the contact sensor 604 is situated at the air bearing surface of the slider at or near a close point of the reader. As such, the contact sensor 604 can be referred to as a read contact sensor. The contact sensor 604 can be configured to sense for one or both of head-medium contact and thermal asperities. The contact sensor can be implemented as a thermal sensor, such as a resistive temperature sensor (e.g., TCR sensor), for example. As shown, the contact sensor is implemented as a DETCR (dual-ended TCR sensor). The contact sensor can be implemented using other technologies, such as a thermocouple or a thermistor.

In FIGS. 6A-6D, three bond pads, P1, P2, and P3, are shown for illustrative purposes. Bond pads P1-P3 can be individually biased in a number of ways, such as by providing a positive voltage, a negative voltage, or a potential equivalent to that of the ground pad at each bond pad, for example. The reader 602 is coupled between bond pads P1 and P2. The contact sensor 604 is coupled between bond pads P2 and P3. The writer heater 606 is coupled between bond pad P3 and a ground pad 620. Because the writer heater 606 is coupled to the ground pad 620, this component (and other components disclosed hereinbelow that are coupled to a ground pad) is referred to herein as a ground-coupled component. Because the reader 602 and the contact sensor 604 are both coupled to bond pad P2, bond pad P2 is considered a shared bond pad. Similarly, because the contact sensor 604 and the writer heater 606 are both coupled to bond pad P3, bond pad P3 is considered the shared bond pad. In general, a shared bond pad of a slider refers to a bond pad to which two or more components (that require power) are coupled. The bond pad sharing configuration shown in FIGS. 6A-6D provides for a reduction or elimination of two bond pads in comparison to a conventional slider configuration.

As is further shown in FIGS. 6A-6D, a diode 610 and a first Zener diode 612 are coupled in series between the third bond pad, P3, and the ground pad 620, such as between bond pad P3 and the writer heater 606. As shown, the anode of the diode 610 is coupled to bond pad P3, and the cathode of the diode 610 is coupled to the cathode of the Zener diode 612. The anode of the Zener diode 612 is coupled to the writer heater 606, and the writer heater 606 is coupled to the ground pad 620. The diode 610 and the Zener diode 612 can be formed during slider fabrication using a wafer process, a pick-and-place methodology or a silicon-on-slider methodology. In some embodiments, the diode 610 can be implemented as a p-n diode. In other embodiments, the diode 610 can be implemented as a Schottky diode (e.g., an SiC Schottky diode), either as part of the wafer process, the silicon-on-slider methodology or the pick-and-place methodology.

According to some embodiments, the Zener diode 612 is incorporated into the circuitry of FIGS. 6A-6D to enhance immunity to ground noise. With the Zener diode 612 incorporated into the circuitry as shown, proper operation can be achieved when the Zener reverse breakdown voltage>>maximum amplitude of ground noise. For example, the Zener diode 612 can be implemented such that the following conditions are satisfied: $(V_+ - V_g) >$ Zener breakdown voltage; $|(V_- - V_g)| >$ Zener breakdown voltage; and the Zener breakdown voltage>>maximum amplitude of ground noise. It is noted that the Zener diode 612 can be eliminated from the circuits shown in FIGS. 6A-6D and other figures if the fluctuation in ground potential is $<|V_+|+V_0$ and $<|V_-|+V_0$, where $V_0$ is the built-in potential (threshold voltage) of the diode 610. The voltages V+ and V− refer to positive and negative bond pad potentials with respect to ground (e.g., ground pad 620). It is further noted that a transistor (e.g., bipolar junction transistor or field-effect transistor) can be used as a substitute for the diode/Zener diode pair shown in FIGS. 6A-6D and other figures. Embodiments that incorporate a switching transistor as a substitute for a diode/Zener diode pair are illustrated in FIGS. 6E and 6F and described in detail hereinbelow.

Addition of Zener diodes provides for enhanced ground noise immunity, and thereby helps to maintain the desired control and directionality of signal flow across the devices (i.e. prevent flipping of a desired OFF state to an ON state due to ground noise). Zener diodes can be optionally incorporated particularly for instances where the magnitude of fluctuation in ground potential (about its mean/nominal value) is larger than the sum of the magnitudes of the applied potential at the bond pad and the diode built-in (threshold) potential. The diodes can be formed using wafer processing, a silicon-on-slider fabrication methodology or a pick-and-place methodology. Alternatively, in other embodiments, the diodes can be of the Schottky type that would be fabricated as part of the wafer process, silicon-on-slider fabrication process or pick-and-place process.

It is noted that, in general, normal diodes should be sufficient if the magnitude of fluctuation in ground potential is less than the sum of |V+| (or |V−|) and the diode's built-in potential (threshold potential). By choosing the magnitudes of V+ (and V−) appropriately in conjunction with a suitable choice of the diode (material combinations and doping levels), the desired directionality and control of signal flow between the devices in the disclosed bond pad sharing schemes can be achieved. The Zener diodes provide additional tolerance to ground potential fluctuation and would be an useful option to exercise if constrained by system architecture (e.g., pre-amp) and design considerations that limit the range of V+ (or V−) or constrained by engineering limitations (e.g., wafer process considerations) in the choice of diodes. According to various embodiments, simple diodes can be the default, and inclusion of Zener diodes can be a fail-safe optional addition.

FIG. 6A shows the circuit operating in a read mode. In a read mode, the reader 602 is energized (active), and the contact sensor 604 and the writer heater 606 are de-energized (inactive). This can be achieved by biasing the bond pads P1-P3 in the manner shown in FIG. 6A. More particularly, the voltage $V_1$ at bond pad P1 is positive, while the voltages $V_2$ and $V_3$ at bond pads P2 and P3 are negative. The reader 602 is energized due to the differential voltage at bond pads P1 and P2. The contact sensor 604 is inactive due to the negative voltages of substantially equal magnitude at bond pads P2 and P3. Given the negative voltage $V_3$ at bond pad P3 relative to the voltage $V_g$ at the ground pad 620, the diode 610 is reversed bias, thereby preventing current flow through the writer heater 606.

FIG. 6B illustrates the circuitry operating in a write mode in which the writer heater 606 is active, and the reader 602 and the contact sensor 604 are inactive. This can be achieved by biasing the bond pads P1-P3 in the manner shown in FIG. 6B. More particularly, the voltages $V_1$, $V_2$, and $V_3$ at bond pads P1, P2, and P3 are positive and preferably of substantially equal magnitude. The writer heater 606 is energized due to the voltage drop between bond pad P3 and the ground pad 620, which is sufficient to forward bias the diode 610. The reader 602 and the contact sensor 604 are inactive due to the positive voltages of substantially equal magnitude at bond pads P1, P2, and P3.

Figure 6C:
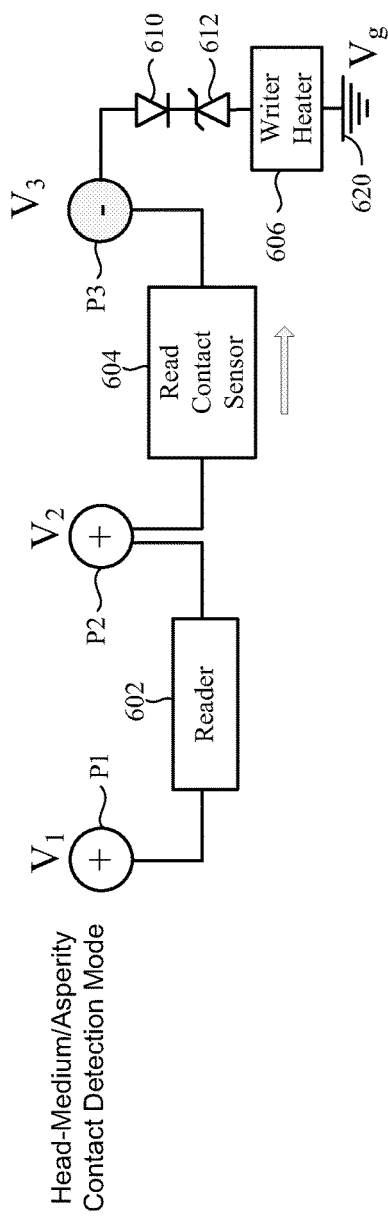

FIG. 6C shows the circuit operating in a contact detection mode. In this mode, the contact sensor 604 may be used to detect one or both of head-medium contact and thermal asperity contact. As was discussed previously, the contact sensor 604 shown in FIG. 6C is preferably situated proximate the close point of a reader of the slider. In other embodiments, the contact sensor 604 can be situated elsewhere on the slider, such as at the close point of a writer of the slider. In the contact detection mode, the contact sensor 604 is active, and the reader 602 and the writer heater 606 are inactive. This can be achieved by biasing the bond pads P1-P3 in the manner shown in FIG. 6C. More particularly, the voltages $V_1$ and $V_2$ at bond pads P1 and P2 are positive, while the voltage $V_3$ at bond pad P3 is negative. The contact sensor 604 is energized due to the differential voltage at bond pads P2 and P3. The reader 602 is inactive due to the positive voltages of substantially equal magnitude at bond pads P1 and P2. Given the negative voltage $V_3$ at bond pad P3 relative to the voltage $V_g$ at the ground pad 620, the diode 610 is reversed bias, thereby preventing current flow through the writer heater 606.

Figure 6D:
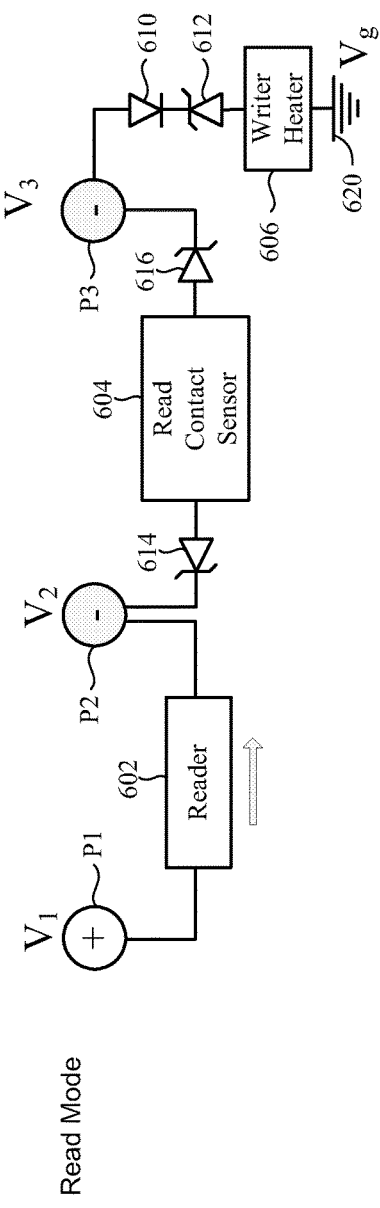
Figure 6E:
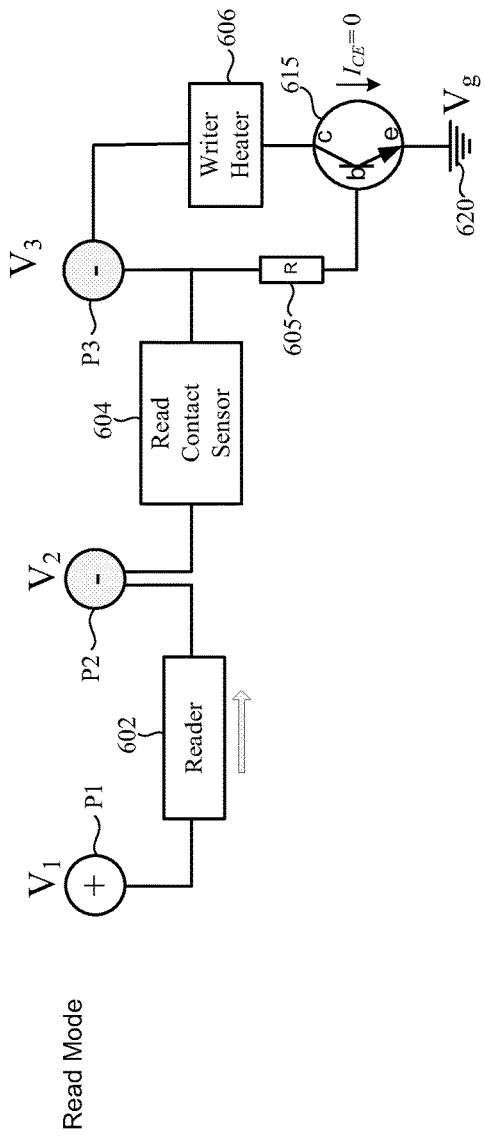
Figure 6F:
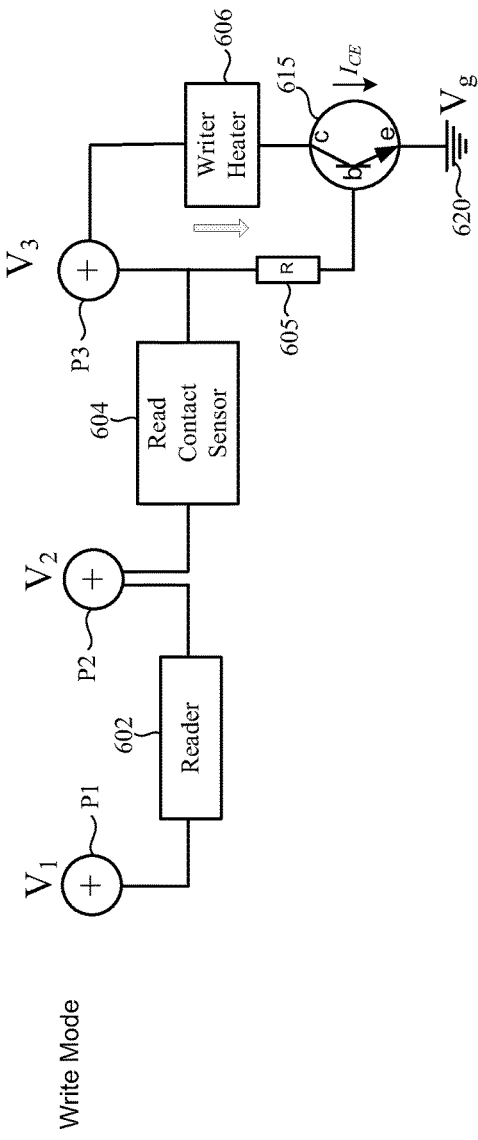

In some slider designs, the contact sensor 604 can generate noise while the reader 602 is active during a read mode. It is noted that the frequency spectrum of any such contact sensor noise should be well-separated from the reader signal frequency spectrum, such that this noise would have a negligible impact on reader performance. However, if contact sensor noise is an issue during read mode operation, Zener diodes can be incorporated into the circuit as shown in FIG. 6D. A second Zener diode 614 is coupled between a first end of the contact sensor 604 and the second bond pad, P2. A third Zener diode 616 (optional) is shown coupled between a second end of the contact sensor 604 and the third bond pad, P3. The Zener diodes 614 and 616 have a sufficiently high reverse bias threshold to prevent flow of any signal from the contact sensor 604 to the reader 602 during read mode operation. It is noted that the Zener diodes 614 and 616 can introduce some nonlinearity in the response of the contact sensor 604.

FIGS. 6E and 6F illustrate circuits that are equivalent to those shown in FIGS. 6A-6D, but substitute a switching transistor for the diode 610/Zener diode 612 pair. As is shown in FIGS. 6E and 6F, the writer heater 606 is coupled between bond pad P3 and a switching transistor 615. In the embodiment shown in FIGS. 6E and 6F, the switching transistor 615 is configured as an NPN bipolar junction transistor (BJT). More particularly, the switching transistor 615 is implemented in the circuitry of FIGS. 6E and 6F according to a common emitter (or grounded emitter) configuration. It is understood that the particular BJT configuration shown in FIGS. 6E and 6F is for illustrative purposes, and that other switching transistor configurations with supporting circuitry are contemplated. For example, a PNP switching transistor (with appropriate circuitry and biasing) can be implemented instead of an NPN switching transistor. Other transistor configurations are contemplated, such as common base and common collector configurations. Alternatively, field-effect transistors (FET), either of the junction-FET type (JFET) or MOS-FET kind, can be employed. These FETs may be more amenable (more compatible with standard wafer processes) for on-wafer fabrication such as in the form of GaAs or AlGaN—GaN heterojunction FETs.

In the embodiment shown in FIGS. 6E and 6F, the collector (c) of the switching transistor 615 is coupled to bond pad P3 via the writer heater 606. The base (b) of the switching transistor 615 is coupled to the contact sensor 604 and bond pad P3 via a resistor (R) 605. The emitter (e) of the switching transistor 615 is coupled to the ground pad 620. The grounded emitter configuration of the switching transistor 615 ensures unidirectional flow of current through the writer heater 606. The grounded emitter configuration of the switching transistor 615 also provides excellent ground noise immunity. Because the transistor 615 is configured for switching rather than amplification, switching transistor 615 is configured to operate in the saturation region and the cut-off region. In the saturation region, the switching transistor 615 is fully ON, operating as a switch with $I_C = I_{saturation}$. In the cut-off region, the switching transistor 615 is fully OFF, operating as a switch with $I_C = 0$. The value of resistor 605 is appropriately chosen so that the switching transistor 615 sets the threshold base current suitably to turn the switching transistor 615 ON in the desired mode of operation (e.g., write mode) while keeping the threshold current high enough to keep the switching transistor 615 in the OFF state in other modes.

FIG. 6E shows the circuitry biased for operation during a read mode. In a read mode, as previously discussed, the reader 602 is active and the contact sensor 604 and writer heater 606 are inactive. Because the voltage $V_3$ of shared bond pad P3 is negative, a negative voltage appears at the base (b) of the switching transistor 615, thereby keeping the switching transistor 615 in the OFF state ($I_{CE}$=0). As such, no current flows through the writer heater 606, which is not needed during the read mode. FIG. 6F shows the circuitry biased for operation during a write mode. In a write mode, as previously discussed, the reader 602 and the contact sensor 604 are inactive, and the writer heater 606 is active. Because the voltage $V_3$ of shared bond pad P3 is positive, a positive voltage appears at the base (b) of the switching transistor 615, causing the switching transistor 615 to switch from the OFF state (shown in FIG. 6E) to the ON state. Accordingly, current flows through the writer heater 606, which is needed during the write mode.

Figure 6G:
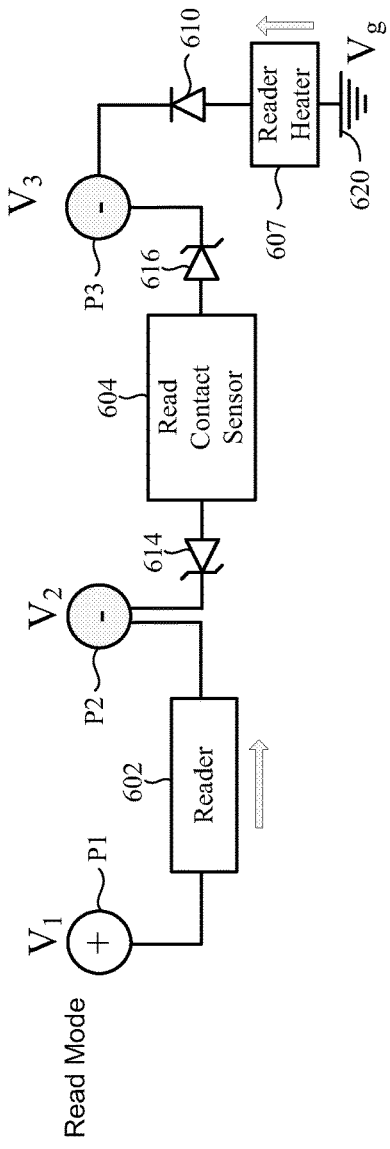
FIGS. 6G and 6H illustrate circuits that support bond pad sharing between a multiplicity of slider components including a reader, a contact sensor, and a reader heater in accordance with various embodiments.
Figure 6H:
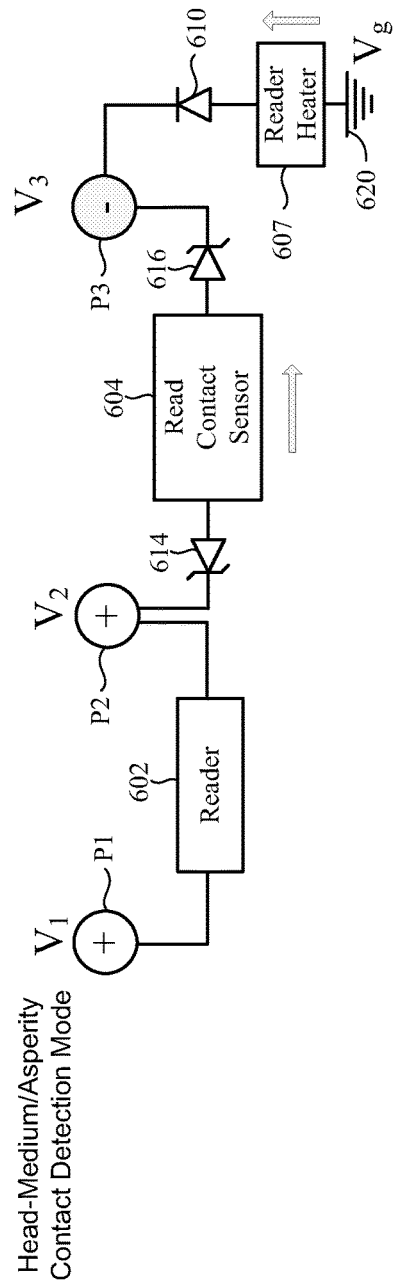

FIGS. 6G and 6H illustrate circuits that support bond pad sharing between a multiplicity of components of a slider in accordance with various embodiments. In particular, FIGS. 6G and 6H illustrate circuitry configured to facilitate bond pad sharing between a reader 602, a contact sensor 604, and a reader heater 607. In the embodiment shown in FIGS. 6G and 6H, the contact sensor 604 is situated at or proximate a reader close point of the slider.

The circuit configuration in FIGS. 6G and 6H is similar to that shown in FIGS. 6A-6D, but differs in a few important ways. In FIGS. 6G and 6H, the cathode of the diode 610 is coupled to bond pad P3, and the anode of the diode 610 is coupled to the reader heater 607. A pair of Zener diodes 614 and 616 (optional) is coupled between the contact sensor 604 and the bond pads P2 and P3, respectively. As was discussed previously, in some slider designs, the contact sensor 604 can generate noise while the reader 602 is active during a read mode. The Zener diodes 614 and 616 have a sufficiently high reverse bias threshold to prevent flow of any signal from the contact sensor 604 to the reader 602 during read mode operation.

FIG. 6G shows the circuit operating in a read mode. In a read mode, the reader 602 is energized (active), the contact sensor 604 is de-energized (inactive), and the reader heater 607 is energized (active) due to forward biasing of the diode 610. This can be achieved by biasing the bond pads P1-P3 in the manner shown in FIG. 6G. FIG. 6H shows the circuit operating in a contact detection mode. In this mode, the reader 602 is de-energized, the contact sensor 604 is energized, and current flows through the reader heater 607 due to forward biasing of the diode 610. This can be achieved by biasing the bond pads P1-P3 in the manner shown in FIG. 6H.

Figure 6I:
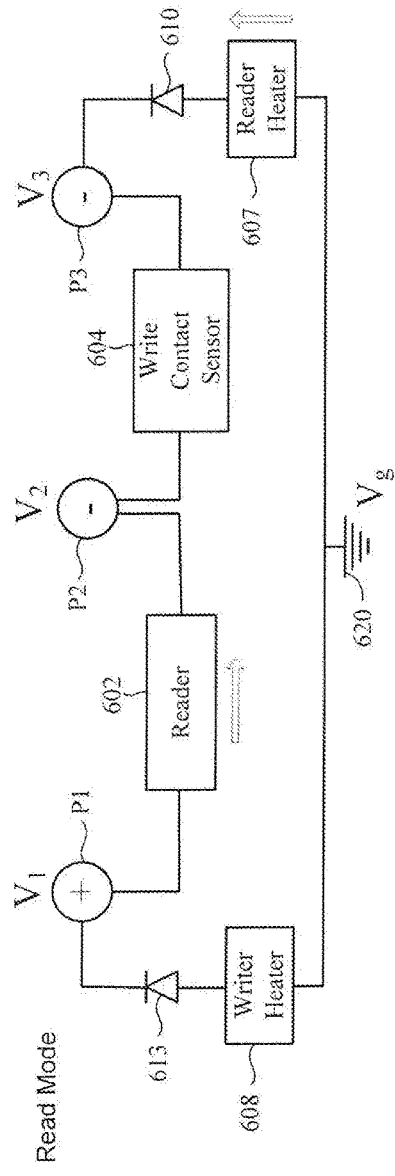
FIGS. 6I and 6J illustrate circuits that support bond pad sharing between a multiplicity of slider components including a reader, a contact sensor, a reader heater, and a writer heater in accordance with various embodiments.
Figure 6J:
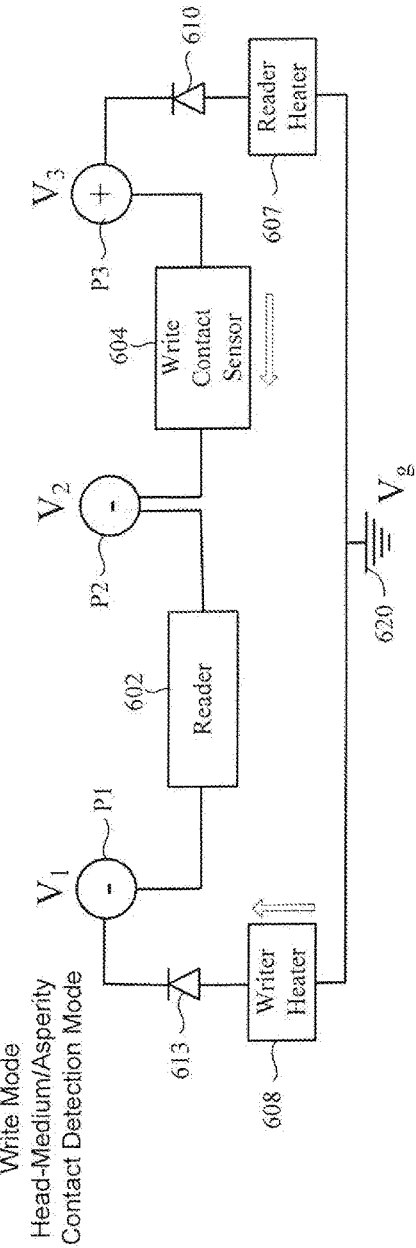

FIGS. 6I and 6J illustrate circuits that support bond pad sharing between a multiplicity of components of a slider in accordance with various embodiments. In particular, FIGS. 6I and 6J illustrate circuitry configured to facilitate bond pad sharing between a reader 602, a contact sensor 604, a reader heater 607, and a writer heater 608. In the embodiment shown in FIGS. 6I and 6J, the contact sensor 604 is situated at or proximate a writer close point of the slider.

In the embodiment shown in FIGS. 6I and 6J, the reader 602 is coupled between bond pads P1 and P2, the contact sensor 604 is coupled between bond pads P2 and P3, the reader heater 607 is coupled between bond pad P3 and the ground pad 620, and the writer heater 608 is coupled between bond pad P1 and the ground pad 620. A cathode of a first diode 610 is coupled to bond pad P3, and the anode of the first diode 610 is coupled to the reader heater 607. A cathode of a second diode 613 is coupled to bond pad P1, and the anode of the second diode 613 is coupled to the writer heater 608.

FIG. 6I shows the circuit operating in a read mode. In this mode, the reader 602 and the reader heater 607 are energized, and the contact sensor 604 and the writer heater 608 are inactive. This can be achieved by biasing the bond pads P1-P3 in the manner shown in FIG. 6I. In the read mode, the first diode 610 is forward biased, allowing current flow through the reader heater 607, and the second diode 613 is reversed biased, preventing current flow through the writer heater 608.

FIG. 6J shows the circuit operating in a write mode, which is also a contact detection mode. In this mode, the contact sensor 604 and the writer heater 608 are active, and the reader 602 and the reader heater 607 are inactive. This can be achieved by biasing the bond pads P1-P3 in the manner shown in FIG. 6J. In the combined write mode/contact detection mode, the first diode 610 is reversed biased, preventing current flow through the reader heater 607, and the second diode 613 is forward biased, allowing current flow through the writer heater 608.

FIGS. 7A-7D illustrate circuits that support bond pad sharing between a multiplicity of components of a slider in accordance with various embodiments. In particular, FIGS. 7A-7D illustrate circuitry configured to facilitate bond pad sharing between a contact sensor 702, a bolometer 704, and a reader heater 706. The bond pad sharing arrangement shown in FIGS. 7A-7D is of particular usefulness in recording heads configured for heat-assisted magnetic recording. The bond pad sharing configuration shown in FIGS. 7A-7D provides for a reduction or elimination of two bond pads in comparison to a conventional slider configuration.

In the embodiment shown in FIGS. 7A-7D, the contact sensor 702 is situated at the air bearing surface of the slider at or near a close point of a writer. As such, the contact sensor 702 can be referred to as a write contact sensor. The contact sensor 702 can be configured to sense for one or both of head-medium contact and thermal asperities, and be of a type previously described. The bolometer 704 is a sensor configured to generate a signal in response to optical energy impinging on the sensor. The bolometer 704 can be implemented as a small wire having a temperature coefficient of resistance and positioned proximate or in the vicinity of an optical component (e.g., NFT, waveguide) of a HAMR slider. The bolometer 704 can be configured to sense and monitor the output optical power of the laser diode used to energize the NFT via the waveguide of the slider. In some implementations, the signal generated by the bolometer 704 can be used to adjust the power supplied to the laser diode of a HAMR device.

In FIGS. 7A-7D, the contact sensor 702 is coupled between bond pads P1 and P2, the bolometer 704 is coupled between bond pads P2 and P3, and the reader heater 706 is coupled between bond pad P3 and the ground pad 720. A diode 710 and a first Zener diode 712 are coupled in series between the third bond pad, P3, and the ground pad 720, such as between bond pad P3 and the reader heater 706. As shown, the anode of the diode 710 is coupled to bond pad P3, and the cathode of the diode 710 is coupled to the cathode of the Zener diode 712. The anode of the Zener diode 712 is coupled to the reader heater 706, and the reader heater 706 is coupled to the ground pad 720. The diode 710 and the Zener diode 712 can be of a type previously described. The Zener diode 712 is incorporated into the circuitry of FIGS. 7A-7D to enhance immunity to ground noise, but can be excluded under conditions previously described. In some embodiments, a switching transistor (e.g., a BJT or FET) can be substituted for the diode 710/Zener diode 712 pair (see, e.g., FIGS. 6E and 6F).

FIG. 7A shows the circuit operating in a read mode. In a read mode, the reader heater 706 is active, and the contact sensor 702 and the bolometer 704 are inactive. This can be achieved by biasing the bond pads P1-P3 in the manner shown in FIG. 7A. More particularly, the voltages $V_1$, $V_2$, and $V_3$ at bond pads P1, P2, and P3 are positive and of substantially equal magnitude. The reader heater 706 is energized due to the voltage drop between bond pad P3 and the ground pad 720, which is sufficient to forward bias the diode 710.

FIG. 7B shows the circuit operating in a laser power monitoring mode, which typically occurs during write mode operation. In the laser power monitoring mode, the bolometer 704 is active, and the contact sensor 702 and the reader heater 706 are inactive. This can be achieved by biasing the bond pads P1-P3 in the manner shown in FIG. 7B. More particularly, the voltages $V_1$ and $V_2$ at bond pads P1 and P2 are positive, while the voltage $V_3$ at bond pad P3 is negative. The bolometer 704 is energized due to the differential voltage at bond pads P2 and P3. The contact sensor 702 is inactive due to the positive voltages of substantially equal magnitude at bond pads P1 and P2. Given the negative voltage $V_3$ at bond pad P3 relative to the voltage $V_g$ at the ground pad 720, the diode 710 is reversed bias, thereby preventing current flow through the reader heater 706.

FIG. 7C shows the circuit operating in a contact detection mode. In this mode, the contact sensor 702 is active, and the bolometer 704 and the reader heater 706 are inactive. This can be achieved by biasing the bond pads P1-P3 in the manner shown in FIG. 7C. More particularly, the voltage $V_1$ at bond pad P1 is positive, while the voltages $V_2$ and $V_3$ at bond pads P2 and P3 are negative. The contact sensor 702 is energized due to the differential voltage at bond pads P1 and P2. The bolometer 704 is inactive due to the negative voltages of substantially equal magnitude at bond pads P2 and P3. Given the negative voltage $V_3$ at bond pad P3 relative to the voltage $V_g$ at the ground pad 720, the diode 710 is reversed bias, thereby preventing current flow through the reader heater 706.

In some slider designs, the contact sensor 702 can generate noise while the bolometer 704 is active during a laser power monitoring mode (e.g., a write mode). If contact sensor noise is an issue during laser power monitoring, Zener diodes can be incorporated into the circuit as shown in FIG. 7D. A second Zener diode 714 is coupled between a first end of the contact sensor 702 and the first bond pad, P1. A third Zener diode 716 is coupled between a second end of the contact sensor 702 and the second bond pad, P2. The Zener diodes 714 and 716 have a sufficiently high reverse bias threshold to prevent flow of any signal from the contact sensor 702 to the bolometer 704 during laser power monitoring. If noise contamination on the contact sensor 702 due to the bolometer 704 is a more significant issue, the Zener diode pairs can be placed on the bolometer leg of the circuit. In principle, Zener pairs as shown in FIG. 7D can be placed on both the contact sensor and bolometer legs of the circuit to insulate the signal in each component from the noise (parasitics) due to the other device during independent operation of each of the devices.

Figure 7G:
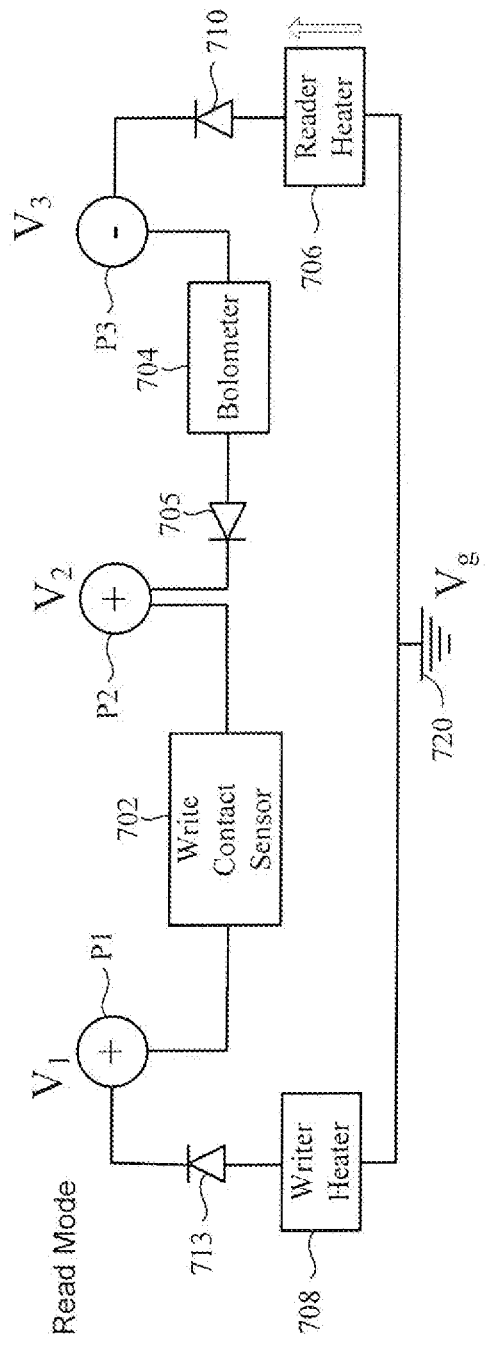

FIGS. 7E-7G illustrate circuits that support bond pad sharing between a multiplicity of components of a slider in accordance with various embodiments. In particular, FIGS. 7E-7G illustrate circuitry configured to facilitate bond pad sharing between a contact sensor 702, a bolometer 704, a reader heater 706, and a writer heater 708. The bond pad sharing arrangement shown in FIGS. 7E-7G is of particular usefulness in recording heads configured for heat-assisted magnetic recording.

In FIGS. 7E-7G, the contact sensor 702 is coupled between bond pads P1 and P2, the bolometer 704 is coupled between bond pads P2 and P3, the reader heater 706 is coupled between bond pad P3 and the ground pad 720, and the writer heater 708 is coupled between bond pad P1 and the ground pad 720. A first diode 710 is coupled between bond pad P3 and the reader heater 706, a second diode 713 is coupled between bond pad P1 and the writer heater 708, and a third diode 705 is coupled between the bolometer 704 and bond pad P2. As shown, the cathode of the first diode 710 is coupled to bond pad P3, the anode of the first diode 710 is coupled to the reader heater 706, and the reader heater 706 is coupled to the ground pad 720. The cathode of the second diode 713 is coupled to bond pad P1, the anode of the second diode 713 is coupled to the writer heater 708, and the writer heater 708 is coupled to the ground pad 720. The cathode of the third diode 705 is coupled to bond pad P2, and the anode of the third diode 705 is coupled to the bolometer 704.

FIG. 7E shows the circuit operating in a write mode, which is also a contact detection mode. In this mode, the contact sensor 702 and the write heater 708 are active, and the bolometer 704 and the reader heater 706 are inactive. This can be achieved by biasing the bond pads P1-P3 in the manner shown in FIG. 7E. As such, the first diode 710 is reversed biased, preventing current flow through the reader heater 706, and the second diode 713 is forward biased, allowing current flow through the writer heater 708. Because V2=V3, no current flows through the bolometer 704 and the third diode 705 in the write/contact detection mode.

FIG. 7F shows the circuit operating in a laser power monitoring mode, which typically occurs during write mode operation. In the laser power monitoring mode, the bolometer 704 and the writer heater 708 are active, and the contact sensor 702, the reader heater 706, and the writer heater 708 are inactive. This can be achieved by biasing the bond pads P1-P3 in the manner shown in FIG. 7F. Accordingly, the first diode 710 is reversed biased, preventing current flow through the reader heater 706, and the second diode 713 is forward biased, allowing current flow through the writer heater 708. Because V3>V2, the third diode 705 is forward biased and current flows through the bolometer 704.

FIG. 7G shows the circuit operating in a read mode. In a read mode, the reader heater 706 is active, and the contact sensor 702, the bolometer 704, and the writer heater 708 are inactive. This can be achieved by biasing the bond pads P1-P3 in the manner shown in FIG. 7G. Accordingly, the first diode 710 is forward biased, allowing current flow through the reader heater 706, and the second diode 713 is reversed biased, preventing current flow through the writer heater 708. Because V3<V2, the third diode 705 is reversed biased and no current flows through the bolometer 704.

A continuing trend in the data storage industry is to provide storage devices with ever higher data storage capacities and data densities. Some recent product designs have proposed the use of multiple read sensors (readers) in a transducer reader section. The use of multiple readers allows the concurrent recovery of data from multiple adjacent data tracks using two-dimensional magnetic recording (TDMR). Multiple readers can also be used to generate separate readback signals from the same data track during so-called multi-signal magnetic recording (MSMR) operations. The embodiments shown in FIGS. 8A-8B and 9A-9D find particular usefulness in the context of TDMR and MSMR configurations.

FIGS. 8A and 8B illustrate circuits that support bond pad sharing between a multiplicity of components of a slider in accordance with various embodiments. In particular, FIGS. 8A and 8B illustrate circuitry configured to facilitate bond pad sharing between a first reader 802, a second reader 804, and a writer heater 806. The bond pad sharing configuration shown in FIGS. 8A and 8B provides for a reduction or elimination of one bond pad in comparison to a conventional slider configuration. It is understood that the circuits illustrated in FIGS. 8A and 8B can incorporate additional readers (e.g., a third reader), and need not be limited to the two readers as shown.

In FIGS. 8A and 8B, the first reader 802 is coupled between bond pads P1 and P2, the second reader 804 is coupled between bond pads P2 and P3, and the writer heater 806 is coupled between bond pad P3 and the ground pad 820. A diode 810 and a first Zener diode 812 are coupled in series between the third bond pad, P3, and the ground pad 820, such as between bond pad P3 and the writer heater 806. As shown, the cathode of the diode 810 is coupled to bond pad P3, and the anode of the diode 810 is coupled to the anode of the Zener diode 812. The cathode of the Zener diode 812 is coupled to the writer heater 806, and the writer heater 806 is coupled to the ground pad 820. The diode 810 and the Zener diode 812 can be of a type previously described. The Zener diode 812 is incorporated into the circuitry of FIGS. 8A and 8B to enhance immunity to ground noise, but can be excluded under conditions previously described. In some embodiments, a switching transistor (e.g., a BJT or FET) can be substituted for the diode 810/Zener diode 812 pair (see, e.g., FIGS. 6E and 6F).

FIG. 8A shows the circuit operating in a read mode. In a read mode, the first and second readers 802 and 804 are active, and the writer heater 806 is inactive. This can be achieved by biasing the bond pads P1-P3 in the manner shown in FIG. 8A. More particularly, the voltage $V_1$, at bond pad P1 is negative, and the voltage $V_2$ is set at a potential equivalent to that of the ground pad 820. This potential is shown at a zero potential for bond pad P2 in FIG. 8A without loss of generality. In the context of FIG. 8A, this implies $V_1 < V_2 < V_3$ and $V_3 > V_g$. Because the voltage $V_2$ at bond pad P2 is higher in potential than the voltage $V_1$, at bond pad P1, the first reader 802 is energized during the read mode. The voltage $V_3$ at bond pad P3 is positive and at a higher potential that the voltage $V_2$ at bond pad P2. As such, the second reader 804 is also energized during the read mode. Given the positive voltage $V_3$ at bond pad P3 relative to the voltage $V_g$ at the ground pad 820, the diode 810 is reversed bias, thereby preventing current flow through the writer heater 806 during the read mode.

FIG. 8B shows the circuit operating in a write mode. In a write mode, the first and second readers 802 and 804 are inactive, and the writer heater 806 is active. This can be achieved by biasing the bond pads P1-P3 in the manner shown in FIG. 8B. More particularly, the voltages $V_1$, $V_2$, and $V_3$ at bond pads P1, P2, and P3 are negative. Because the voltages $V_1$, $V_2$, and $V_3$ are negative and of substantially the same magnitude, the first and second readers 802 and 804 are de-energized during the write mode. The writer heater 806 is energized due to the voltage drop between the ground pad 820 and the bond pad P3, which is sufficient to forward bias the diode 810.

Figure 8E:
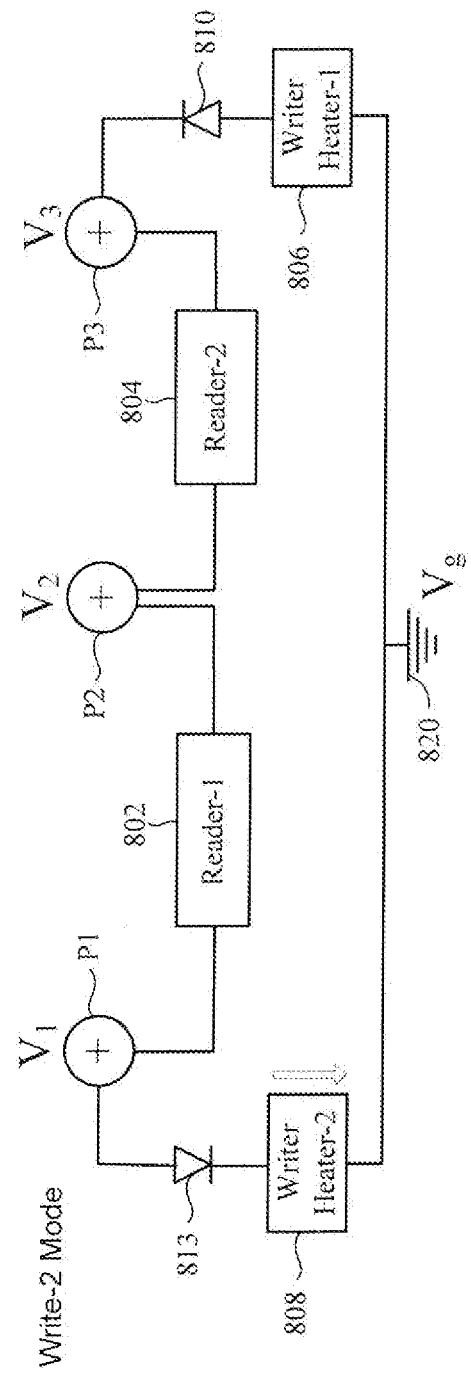

FIGS. 8C-8E illustrate circuits that support bond pad sharing between a multiplicity of components of a slider in accordance with various embodiments. In particular, FIGS. 8C-8E illustrate circuitry configured to facilitate bond pad sharing between a first reader 802, a second reader 804, a first writer heater 806, and a second writer heater 808. The embodiment shown in FIGS. 8C-8E is directed to a slider configured to implement both IMR and MSMR/TDMR.

The circuit illustrated in FIGS. 8C-8E is similar to that shown in FIGS. 8A and 8B, but includes the second writer heater 808, which is coupled between bond pad P1 and the ground pad 820. A first diode 810 is coupled between bond pad P3 and the first writer heater 806, and a second diode 813 is coupled between bond pad P1 and the second writer heater 808. As shown, the cathode of the first diode 810 is coupled to bond pad P3 and the anode of the first diode 810 is coupled to the first writer heater 806. The anode of the second diode 813 is coupled to bond pad P1 and the cathode of the second diode 813 is coupled to the second writer heater 808.

FIG. 8C shows the circuit operating in a read mode. In a read mode, the first and second readers 802 and 804 are active, and the first and second writer heaters 806 and 808 are inactive. This can be achieved by biasing the bond pads P1-P3 in the manner shown in FIG. 8C ($V_1 < V_2 < V_3$), noting the potential is shown as a zero potential for bond pad P2. Accordingly, the first and second diodes 810 and 813 are reversed biased, preventing current flow through the first and second writer heaters 806 and 808.

FIG. 8D shows the circuit operating in a write-1 mode. In this mode, the first writer heater 806 (and a first writer) is active, and the first and second readers 802 and 804 and the second writer heater 808 are inactive. This can be achieved by biasing the bond pads P1-P3 in the manner shown in FIG. 8D. Accordingly, the first diode 810 is forward biased, allowing current flow through the first writer heater 806, and the second diode 813 is reversed biased, preventing current flow through the second writer heater 808.

FIG. 8E shows the circuit operating in a write-2 mode. In this mode, the second writer heater 808 (and a second writer) is active, and the first and second readers 802 and 804 and the first writer heater 806 are inactive. This can be achieved by biasing the bond pads P1-P3 in the manner shown in FIG. 8E. Accordingly, the second diode 813 is forward biased, allowing current flow through the second writer heater 808, and the first diode 810 is reversed biased, preventing current flow through the first writer heater 806.

FIGS. 9A-9D illustrate circuits that support bond pad sharing between a multiplicity of components of a slider in accordance with various embodiments. In particular, FIGS. 9A-9D illustrate circuitry configured to facilitate bond pad sharing between a first reader 902, a second reader 905, a contact sensor 904, and a writer heater 906. The bond pad sharing configuration shown in FIGS. 9A-9D provides for a reduction or elimination of three bond pads in comparison to a conventional slider configuration.

Figure 9A:
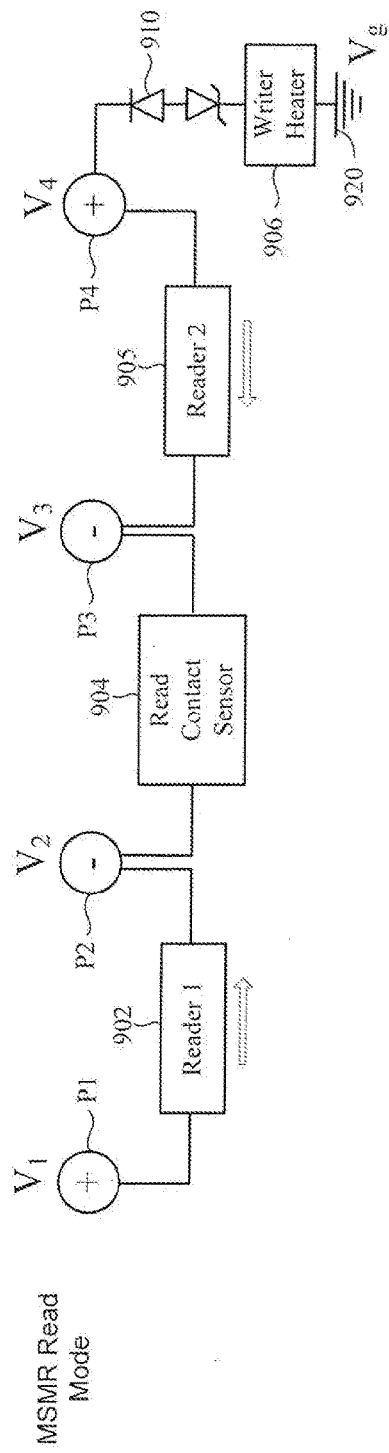
FIGS. 9A, 9B, 9C, and 9D illustrate circuits that support bond pad sharing between a multiplicity of slider components including a first reader, a contact sensor, a second reader, and a writer heater in accordance with various embodiments.

FIG. 9A shows the circuit operating in a read mode. In a read mode, the first and second readers 902 and 905 are active, and the contact sensor 904 and writer heater 906 are inactive. This can be achieved by biasing the bond pads P1-P4 in the manner shown in FIG. 9A. More particularly, the voltages $V_1$ and $V_4$ at bond pads P1 and P4 are positive, and the voltages $V_2$ and $V_3$ are negative. Because the voltages $V_1$ and $V_4$ at bond pads P1 and P4 are higher in potential than the voltages $V_2$ and $V_3$ at bond pads P2 and P3, the first reader 902 and the second reader 905 are energized during the read mode. The contact sensor 904, which is a read contact sensor in this embodiment, is inactive during the read mode, since the voltages $V_2$ and $V_3$ at bond pads P2 and P3 are of the same polarity and substantially the same magnitude. Given the positive voltage $V_4$ at bond pad P4 relative to the voltage $V_g$ at the ground pad 920, the diode 910 is reversed bias, thereby preventing current flow through the writer heater 906 during the read mode.

Figure 9B:
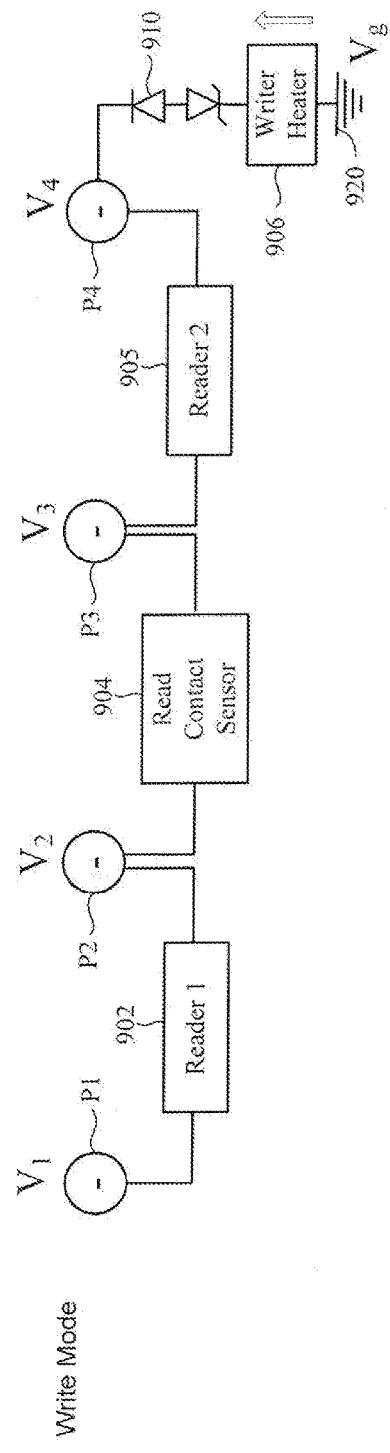

FIG. 9B shows the circuit operating in a write mode. In a write mode, the first reader 902, the second reader 905, and the contact sensor 904 are inactive, and the writer heater 906 is active. This can be achieved by biasing the bond pads P1-P4 in the manner shown in FIG. 9B. More particularly, the voltages $V_1$, $V_2$, $V_3$, and $V_4$ at bond pads P1, P2, P3, and P4 are negative. Because the voltages $V_1$-V4 at bond pads P1-P4 are of the same polarity and substantially the same magnitude, the first reader 902, the second reader 905, and the contact sensor 904 are de-energized during the write mode. The writer heater 906 is energized due to the voltage drop between the ground pad 920 and the bond pad P4, which is sufficient to forward bias the diode 910.

Figure 9C:
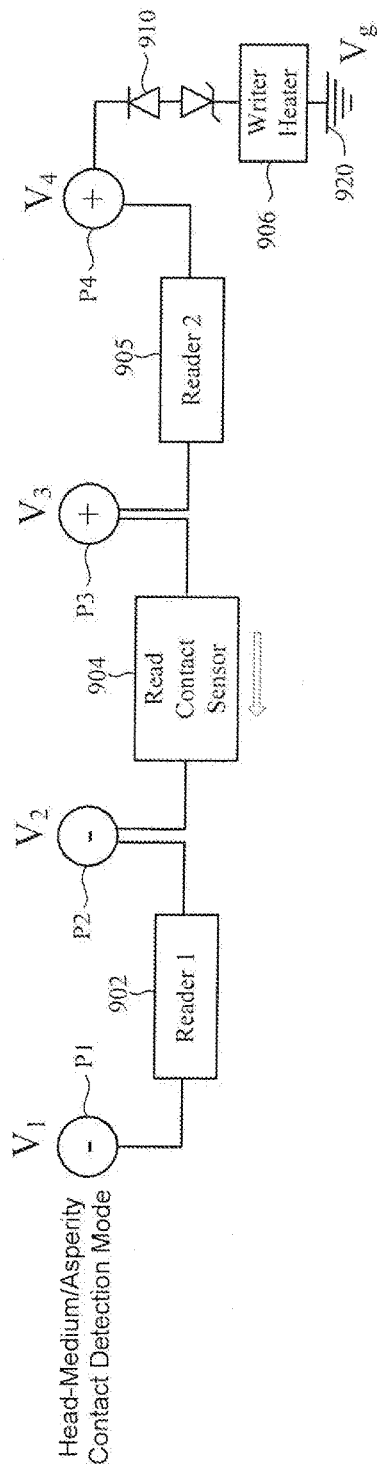

FIG. 9C shows the circuit operating in a contact detection mode. In a contact detection mode, the first reader 902, the second reader 905, and the writer heater 906 are inactive, and the contact sensor 904 is active. This can be achieved by biasing the bond pads P1-P4 in the manner shown in FIG. 9C. More particularly, the voltages $V_1$ and $V_2$ at bond pads P1 and P2 are negative, and the voltages $V_3$ and $V_4$ are positive. Because the voltage $V_3$ at bond pad P3 is higher in potential than the voltage $V_2$ at bond pad P2, the contact sensor 904 is energized during the contact detection mode. Because the voltages $V_1$ and $V_2$ at bond pads P1 and P2 and the voltages $V_3$ and $V_4$ at bond pads P3 and P4 are of the same polarity and substantially the same magnitude, respectively, the first reader 902 and the second reader 905 are de-energized during the contact detection mode. Given the positive voltage $V_4$ at bond pad P4 relative to the voltage $V_g$ at the ground pad 920, the diode 910 is reversed bias, thereby preventing current flow through the writer heater 906 during the contact detection mode.

Figure 9D:
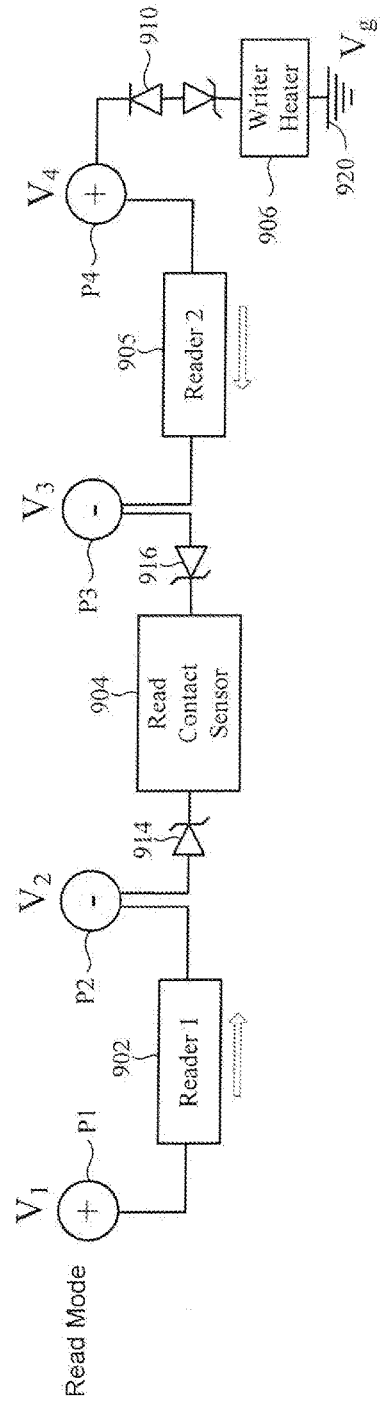

As was discussed previously, in some slider designs, the contact sensor 904 can generate noise while the readers 902 and 905 are active during a read mode. If contact sensor noise is an issue during read mode operation, Zener diodes can be incorporated into the circuit as shown in FIG. 9D. A second Zener diode 914 is coupled between a first end of the contact sensor 904 and the second bond pad, P2. A third Zener diode 916 is coupled between a second end of the contact sensor 904 and the third bond pad, P3. The Zener diodes 914 and 916 have a sufficiently high reverse bias threshold to prevent flow of any signal from the contact sensor 904 to the readers 902 and 905 during read mode operation.

Figure 9E:
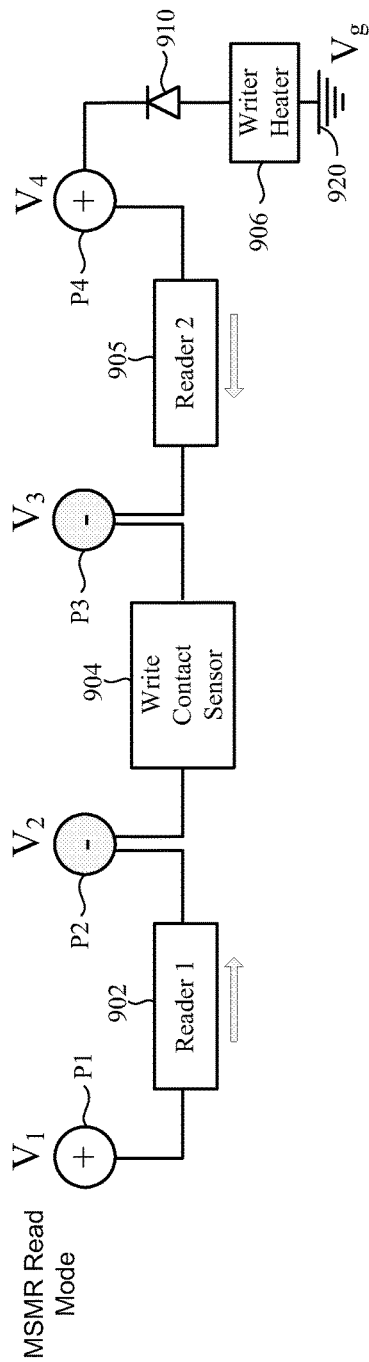
FIGS. 9E and 9F illustrate circuits that support bond pad sharing between a multiplicity of slider components including a first reader, a contact sensor, a second reader, and a writer heater in accordance with various embodiments.
Figure 9F:
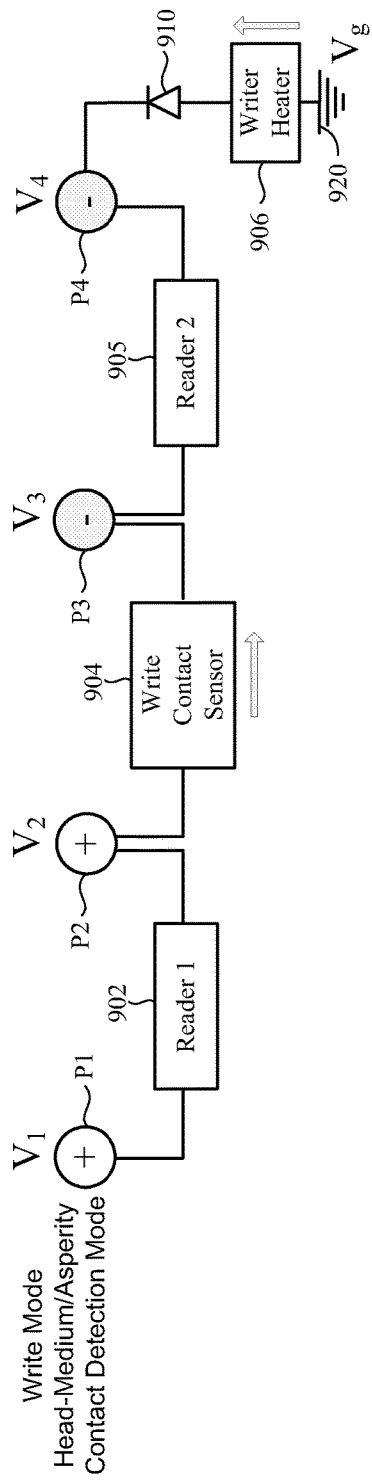

FIGS. 9E and 9F illustrate circuits that support bond pad sharing between a multiplicity of components of a slider in accordance with various embodiments. In particular, FIGS. 9E and 9F illustrate circuitry configured to facilitate bond pad sharing between a first reader 902, a second reader 905, a contact sensor 904, and a writer heater 906. In the embodiment illustrated in FIGS. 9E and 9F, the contact sensor 904 is situated at or near a write close point of the slider, and is energized concurrently with the writer heater 906. It is noted that a Zener diode can be added between the contact sensor 904 and each of the bond pads P2 and P3 to enhance noise immunity of the circuit during read mode operations of the first and second readers 902 and 905.

FIG. 9E shows the circuit operating in a read mode. In a read mode, the first and second readers 902 and 905 are active, and the contact sensor 904 and writer heater 906 are inactive. This can be achieved by biasing the bond pads P1-P4 in the manner shown in FIG. 9E. As such, the diode 906 is reversed biased, and no current flows through the writer heater 906. FIG. 9F shows the circuit operating in a write mode, which is also a contact detection mode. In this mode, the first reader 902 and the second reader 905 are inactive, and the contact sensor 904 and the writer heater 906 are active. This can be achieved by biasing the bond pads P1-P4 in the manner shown in FIG. 9F ($V_1$=$V_2$, and $V_3$=$V_4$). Accordingly, the diode 906 is forward biased, and current flows through the writer heater 906.

FIGS. 10A-10E illustrate circuits that support bond pad sharing between a multiplicity of components of a slider in accordance with various embodiments. In particular, FIGS. 10A-10E illustrate circuitry configured to facilitate bond pad sharing between a contact sensor 1002, a reader 1004, a first writer heater 1006, and a second writer heater 1008. The bond pad sharing arrangement shown in FIGS. 10A-10E is of particular usefulness in recording heads configured for interlaced magnetic recording. The bond pad sharing configuration shown in FIGS. 10A-10E provides for a reduction or elimination of three bond pads in comparison to a conventional slider configuration.

In FIGS. 10A-10E, the contact sensor 1002 is coupled between bond pads P1 and P2, and the reader 1004 is coupled between bond pads P2 and P3. In the embodiments shown in FIGS. 10A-10E, the contact sensor 1002 is configured as a read contact sensor. The first writer heater 1006 is coupled between bond pad P3 and the ground pad 1020, and the second writer heater 1008 is coupled between the bond pad P1 and the ground pad 1020. Each of the three bond pads P1-P3 is a shared bond pad in the embodiment shown in FIGS. 10A-10E. A first diode 1010 and a first Zener diode 1012 are coupled in series between the third bond pad, P3, and the ground pad 1020, such as between bond pad P3 and the first writer heater 1006. As shown, the anode of the first diode 1010 is coupled to bond pad P3, and the cathode of the first diode 1010 is coupled to the cathode of the first Zener diode 1012. The anode of the first Zener diode 1012 is coupled to the first writer heater 1006, and the first writer heater 1006 is coupled to the ground pad 1020.

A second diode 1014 and a second Zener diode 1016 are coupled in series between the first bond pad, P1, and the ground pad 1020, such as between bond pad P1 and the second writer heater 1008. As shown, the cathode of the second diode 1014 is coupled to bond pad P1, and the anode of the second diode 1014 is coupled to the anode of the second Zener diode 1016. The cathode of the second Zener diode 1016 is coupled to the second writer heater 1008, and the second writer heater 1008 is coupled to the ground pad 1020. The diodes 1010, 1014 and the Zener diodes 1012, 1016 can be of a type previously described. The Zener diodes 1012 and 1016 are incorporated into the circuitry of FIGS. 10A-10E to enhance immunity to ground noise, but can be excluded under conditions previously described. In some embodiments, a switching transistor (e.g., a BJT or FET) can be substituted for the diode 1010/Zener diode 1012 and diode 1014/Zener diode 1016 pairs (see, e.g., FIGS. 6E and 6F).

FIG. 10A shows the circuit operating in a contact detection mode. In this mode, the contact sensor 1002 is active, and the reader 1004 and the first and second writer heaters 1006 and 1008 are inactive. This can be achieved by biasing the bond pads P1-P3 in the manner shown in FIG. 10A. More particularly, the voltage $V_1$ at bond pad P1 is positive, while the voltages $V_2$ and $V_3$ at bond pads P2 and P3 are negative. The contact sensor 1002 is energized due to the differential voltage at bond pads P1 and P2. The reader 1004 is inactive due to the negative voltages of substantially equal magnitude at bond pads P2 and P3. Given the negative voltage $V_3$ at bond pad P3 relative to the voltage $V_g$ at the ground pad 1020, the first diode 1010 is reversed bias, thereby preventing current flow through the first writer heater 1006. Given the positive voltage $V_1$ at bond pad P1 relative to the voltage $V_g$ at the ground pad 1020, the second diode 1014 is reversed bias, thereby preventing current flow through the second writer heater 1008.

FIG. 10B shows the circuit operating in a read mode. In a read mode, the reader 1004 is active, and the contact sensor 1002 and the first and second writer heaters 1006 and 1008 are inactive. This can be achieved by biasing the bond pads P1-P3 in the manner shown in FIG. 10B. More particularly, the voltages $V_1$ and $V_2$ at bond pads P1 and P2 are positive, while the voltage $V_3$ at bond pad P3 is negative. The reader 1004 is energized due to the differential voltage at bond pads P2 and P3. The contact sensor 1002 is inactive due to the positive voltages of substantially equal magnitude at bond pads P1 and P2. Given the negative voltage $V_3$ at bond pad P3 relative to the voltage $V_g$ at the ground pad 1020, the first diode 1010 is reversed bias, thereby preventing current flow through the first writer heater 1006. Given the positive voltage $V_1$ at bond pad P1 relative to the voltage $V_g$ at the ground pad 1020, the second diode 1014 is reversed bias, thereby preventing current flow through the second writer heater 1008.

FIG. 10C shows the circuit operating in a first write mode. In a first write mode, the first writer heater 1006 (and a first writer) is active, and the contact sensor 1002, the reader 1004, and the second writer heater 1008 are inactive. This can be achieved by biasing the bond pads P1-P3 in the manner shown in FIG. 10C. More particularly, the voltages $V_1$, $V_2$, and $V_3$ at bond pads P1, P2, and P3 are positive. The contact sensor 1002 and the reader 1004 are inactive due to the positive voltages of substantially equal magnitude at bond pads P1, P2, and P3. Given the positive voltage $V_1$ at bond pad P1 relative to the voltage $V_g$ at the ground pad 1020, the second diode 1014 is reversed bias, thereby preventing current flow through the second writer heater 1008. The first writer heater 1006 is energized due to the voltage drop between the bond pad P3 and the ground pad 1020, which is sufficient to forward bias the first diode 1010.

FIG. 10D shows the circuit operating in a second write mode. In a second write mode, the second writer heater 1008 (and a second writer) is active, and the contact sensor 1002, the reader 1004, and the first writer heater 1006 are inactive. This can be achieved by biasing the bond pads P1-P3 in the manner shown in FIG. 10D. More particularly, the voltages $V_1$, $V_2$, and $V_3$ at bond pads P1, P2, and P3 are negative. The contact sensor 1002 and the reader 1004 are inactive due to the negative voltages of substantially equal magnitude at bond pads P1, P2, and P3. Given the negative voltage $V_3$ at bond pad P3 relative to the voltage $V_g$ at the ground pad 1020, the first diode 1010 is reversed bias, thereby preventing current flow through the first writer heater 1006. The second writer heater 1008 is energized due to the voltage drop between the ground pad 1020 and the bond pad P1, which is sufficient to forward bias the second diode 1014.

Figure 10E:
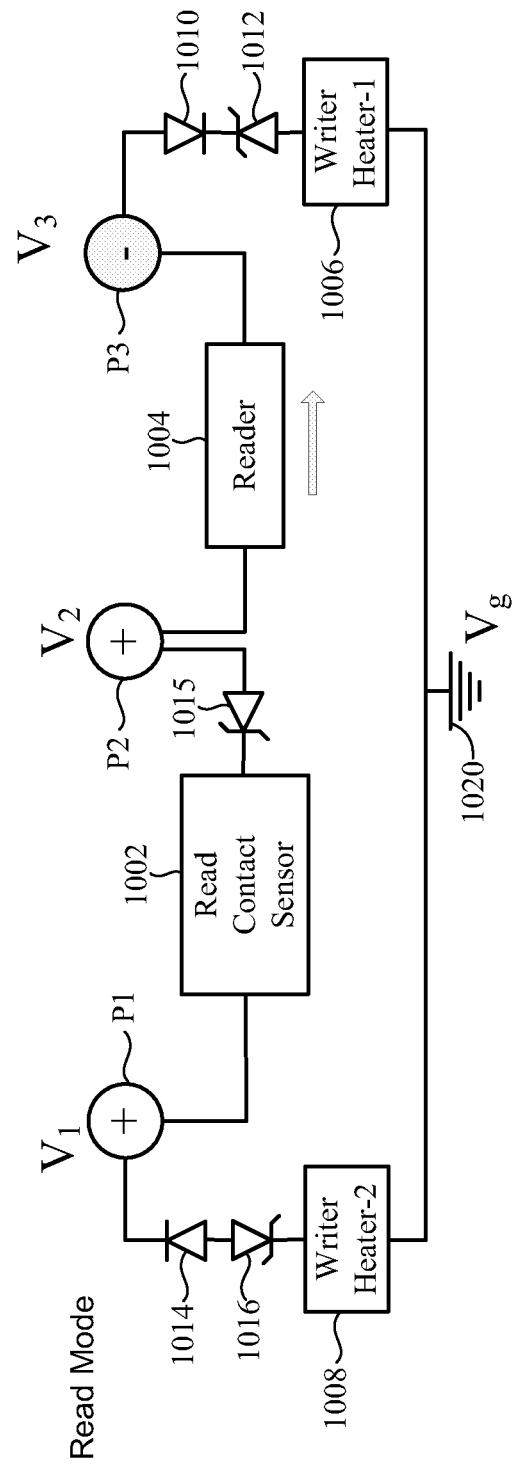

FIG. 10E shows the circuit operating in a read mode. The circuit of FIG. 10E is biased in the same way and operates in the same manner as that shown in FIG. 10B. In the circuit of FIG. 10E, a Zener diode 1015 is incorporated between the contact sensor 1002 and the second bond pad, P2, to enhance ground noise immunity. The Zener diode 1015 has a sufficiently high reverse bias threshold to prevent flow of any signal from the contact sensor 1002 to the reader 1004 during read mode operation.

Figure 10F:
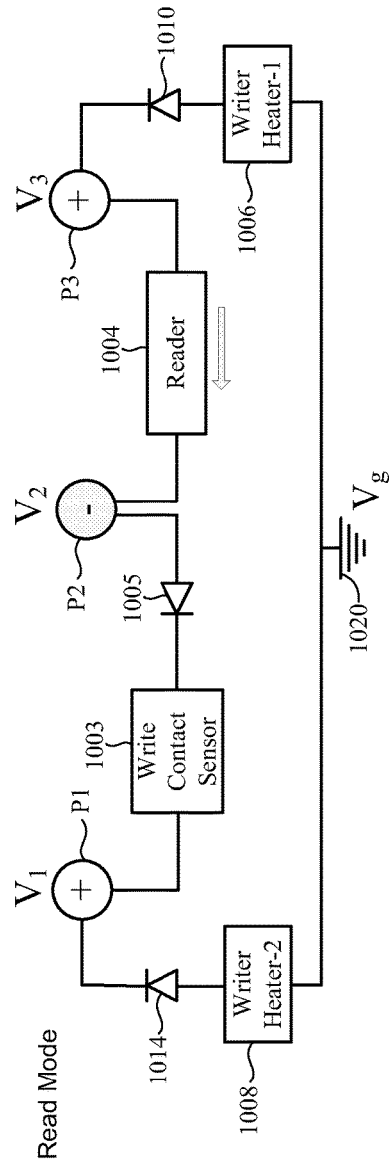
FIGS. 10F, 10G, and 10H illustrate circuits that support bond pad sharing between a multiplicity of slider components including a contact sensor, a reader, a first writer heater, and a second writer heater in accordance with various embodiments.
Figure 10G:
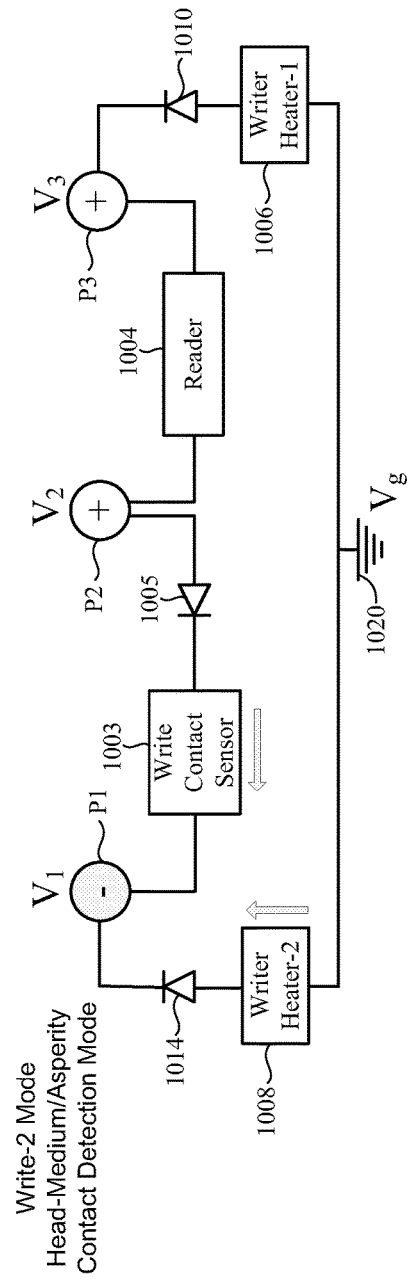
Figure 10H:
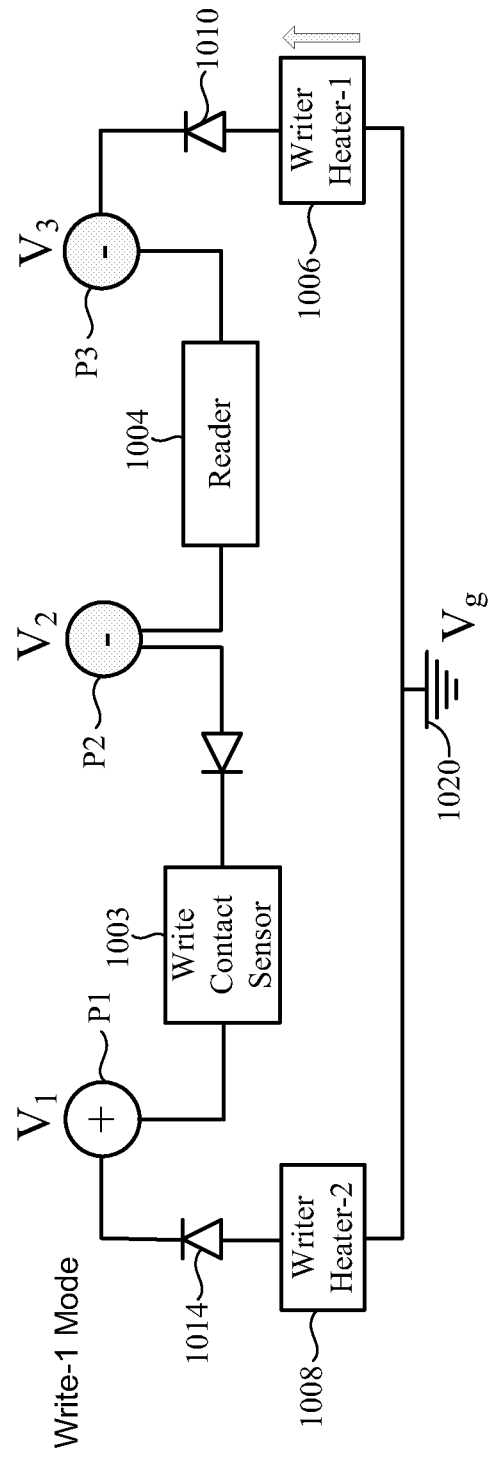

FIGS. 10F-10H illustrate circuits that support bond pad sharing between a multiplicity of components of a slider in accordance with various embodiments. In particular, FIGS. 10F-10H illustrate circuitry configured to facilitate bond pad sharing between a write contact sensor 1003 (in contrast to the read contact sensor 1002 of FIGS. 10A-10E), a reader 1004, a first writer heater 1006, and a second writer heater 1008. The bond pad sharing arrangement shown in FIGS. 10F-10H is of particular usefulness in recording heads configured for interlaced magnetic recording.

In FIGS. 10F-10H, the write contact sensor 1003 is coupled between bond pads P1 and P2, the reader 1004 is coupled between bond pads P2 and P3, the first writer heater 1006 is coupled between bond pad P3 and the ground pad 1020, and the second writer heater 1008 is coupled between bond pad P1 and the ground pad 1020. A first diode 1010 has a cathode coupled to bond pad P3 and an anode coupled to the first writer heater 1006. A second diode 1014 has a cathode coupled to bond pad P1 and an anode coupled to the second writer heater 1008. A third diode 1005 has a cathode coupled to the contact sensor 1003 and bond pad P2. It is noted that a Zener diode can be added between the contact sensor 1003 and each of the bond pads P1 and P2 to enhance noise immunity of the circuit during read mode operations of the reader 1004.

FIG. 10F shows the circuit operating in a read mode. In a read mode, the reader 1004 is active, and the contact sensor 1003 and the first and second writer heaters 1006 and 1008 are inactive. This can be achieved by biasing the bond pads P1-P3 in the manner shown in FIG. 10F. Accordingly, the first, second, and third diodes 1010, 1014, and 1005 are reversed biased, preventing current flow through the first and second writer heaters 1006 and 1008 and the contact sensor 1003.

FIG. 10G shows the circuit operating in a second write mode, which is also a contact detection mode. In this mode, the second writer heater 1008 (and a second writer) and the contact sensor 1003 are active, and the reader 1004 and the first writer heater 1006 are inactive. This can be achieved by biasing the bond pads P1-P3 in the manner shown in FIG. 10G. As such, the first diode 1006 is reversed biased, preventing current flow through the first writer heater 1006, and the second diode 1008 is forward biased, allowing current flow through the second writer heater 1008. The third diode 1005 is forward biased, allowing current flow through the contact sensor 1003.

FIG. 10H shows the circuit operating in a first write mode. In this mode, the first writer heater 1006 (and a first writer) is active, and the contact sensor 1003, reader 1004, and the second heater 1008 are inactive. This can be achieved by biasing the bond pads P1-P3 in the manner shown in FIG. 10H. As such, the first diode 1006 is forward biased, allowing current flow through the first writer heater 1006, and the second diode 1008 is reversed biased, preventing current flow through the second writer heater 1008. The third diode 1005 is reversed biased, preventing current flow through the contact sensor 1003.

FIGS. 11A-11E illustrate circuits that support bond pad sharing between a multiplicity of components of a slider in accordance with various embodiments. In particular, FIGS. 11A-11E illustrate circuitry configured to facilitate bond pad sharing between a first reader 1102, a second reader 1105, a contact sensor 1104, a first writer heater 1106, and a second writer heater 1108. The bond pad sharing arrangement shown in FIGS. 11A-11E is of particular usefulness in recording heads configured for IMR and TDMR/MSMR. The bond pad sharing configuration shown in FIGS. 11A-11E provides for a reduction or elimination of four bond pads in comparison to a conventional slider configuration.

In FIGS. 11A-11E, the first reader 1102 is coupled between bond pads P1 and P2, the contact sensor 1104 is coupled between bond pads P2 and P3, and the second reader 1105 is coupled between bond pads P3 and P4. In the embodiments shown in FIGS. 11A-11E, the contact sensor 1104 is configured as a read contact sensor. The first writer heater 1106 is coupled between bond pad P3 and the ground pad 1120, and the second writer heater 1108 is coupled between the bond pad P1 and the ground pad 1120. A first diode 1110 and a first Zener diode 1112 are coupled in series between the third bond pad, P3, and the ground pad 1120, such as between bond pad P3 and the first writer heater 1106. As shown, the anode of the first diode 1110 is coupled to bond pad P3, and the cathode of the first diode 1110 is coupled to the cathode of the first Zener diode 1112. The anode of the first Zener diode 1112 is coupled to the first writer heater 1106, and the first writer heater 1106 is coupled to the ground pad 1120.

A second diode 1114 and a second Zener diode 1116 are coupled in series between the first bond pad, P1, and the ground pad 1120, such as between bond pad P1 and the second writer heater 1108. As shown, the cathode of the second diode 1114 is coupled to bond pad P1, and the anode of the second diode 1114 is coupled to the anode of the second Zener diode 1116. The cathode of the second Zener diode 1116 is coupled to the second writer heater 1108, and the second writer heater 1108 is coupled to the ground pad 1120. The diodes 1110, 1114 and the Zener diodes 1112, 1116 can be of a type previously described. The Zener diodes 1112 and 1116 are incorporated into the circuitry of FIGS. 11A-11E to enhance immunity to ground noise, but can be excluded under conditions previously described. In some embodiments, a switching transistor (e.g., a BJT or FET) can be substituted for the diode 1110/Zener diode 1112 and diode 1112/Zener diode 1116 pairs (see, e.g., FIGS. 6E and 6F).

FIG. 11A shows the circuit operating in a read mode. In a read mode, the first and second readers 1102 and 1105 are active, and the contact sensor 1104, the first writer heater 1106, and the second writer heater 1108 are inactive. This can be achieved by biasing the bond pads P1-P4 in the manner shown in FIG. 11A. More particularly, the voltages $V_1$ and $V_4$ at bond pads P1 and P4 are positive, and the voltages $V_2$ and $V_3$ at bond pads P2 and P3 are negative. Because the voltages $V_1$ and $V_4$ at bond pads P1 and P4 are higher in potential than the voltages $V_2$ and $V_3$ at bond pads P2 and P3, the first reader 1102 and the second reader 1105 are energized during the read mode. The contact sensor 1104, which is a read contact sensor in this embodiment, is inactive during the read mode, since the voltages $V_2$ and $V_3$ at bond pads P2 and P3 are of the same polarity and substantially the same magnitude. Given the negative voltage $V_3$ at bond pad P3 relative to the voltage $V_g$ at the ground pad 1120, the first diode 1110 is reversed bias, thereby preventing current flow through the writer heater 1106 during the read mode. Given the positive voltage $V_1$ at bond pad P1 relative to the voltage $V_g$ at the ground pad 1120, the second diode 1114 is reversed bias, thereby preventing current flow through the second writer heater 1108 during the read mode.

FIG. 11B shows the circuit operating in a contact detection mode. In this mode, the contact sensor 1104 is active, and the first reader 1102, the second reader 1105, the first writer heater 1106, and the second writer heater 1108 are inactive. This can be achieved by biasing the bond pads P1-P4 in the manner shown in FIG. 11B. More particularly, the voltages $V_1$ and $V_2$ at bond pads P1 and P2 are positive, and the voltages $V_3$ and $V_4$ at bond pads P3 and P4 are negative. Because the voltage $V_2$ at bond pad P2 is higher in potential than the voltage $V_3$ at bond pad P3, the contact sensor 1104 is energized during the contact detection mode. The first and second readers 1102 and 1105 are inactive during the contact detection mode, since the voltages $V_1$ and $V_2$ at bond pads P1 and P2 and the voltages $V_3$ and $V_4$ at bond pads P3 and P4 are of the same polarity and substantially the same magnitude, respectively. Given the negative voltage $V_3$ at bond pad P3 relative to the voltage $V_g$ at the ground pad 1120, the first diode 1110 is reversed bias, thereby preventing current flow through the writer heater 1106 during the contact detection mode. Given the positive voltage $V_1$ at bond pad P1 relative to the voltage $V_g$ at the ground pad 1120, the second diode 1114 is reversed bias, thereby preventing current flow through the second writer heater 1108 during the contact detection mode.

Figure 11C:
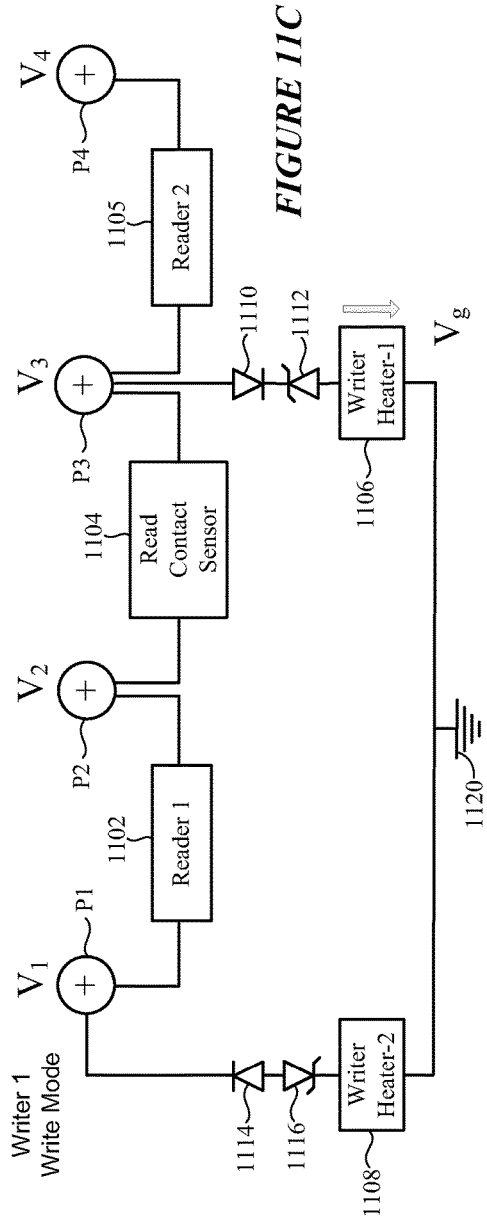

FIG. 11C shows the circuit operating in a first write mode. In a first write mode, the first writer heater 1106 (and a first writer) is active, and first reader 1102, the second reader 1105, and the second writer heater 1108 are inactive. This can be achieved by biasing the bond pads P1-P4 in the manner shown in FIG. 11C. More particularly, the voltages $V_1$, $V_2$, $V_3$, and V4 at bond pads P1, P2, P3, and P4 are positive. The first reader 1102, the contact sensor 1104, and the second reader 1105 are inactive due to the positive voltages of substantially equal magnitude at bond pads P1, P2, P3, and P4. Given the positive voltage $V_1$ at bond pad P1 relative to the voltage $V_g$ at the ground pad 1120, the second diode 1114 is reversed bias, thereby preventing current flow through the second writer heater 1108. The first writer heater 1106 is energized due to the voltage drop between the bond pad P3 and the ground pad 1120, which is sufficient to forward bias the first diode 1110.

Figure 11D:
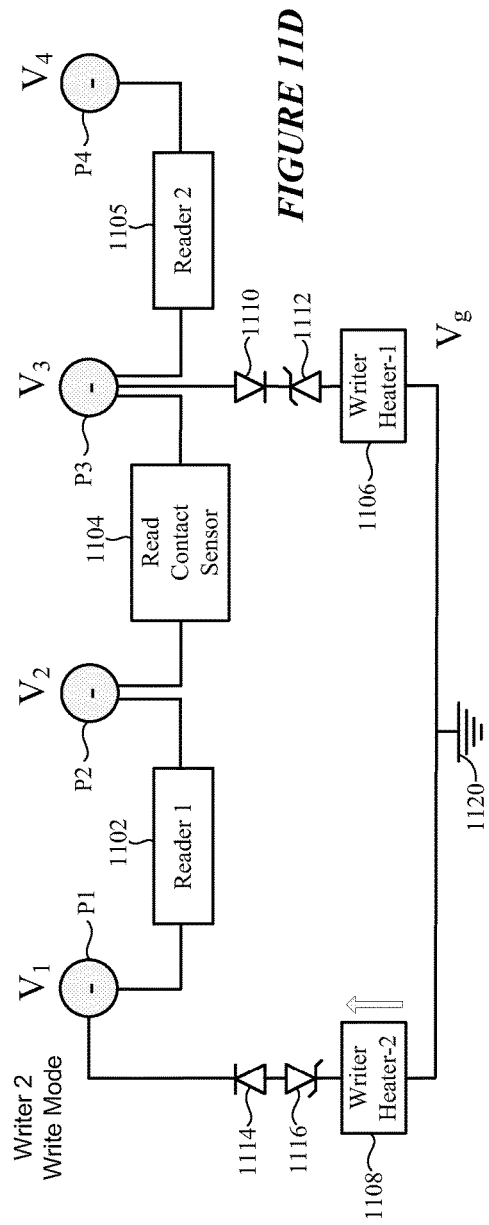

FIG. 11D shows the circuit operating in a second write mode. In a second write mode, the second writer heater 1108 (and a second writer) is active, and first reader 1102, the second reader 1105, and the first writer heater 1106 are inactive. This can be achieved by biasing the bond pads P1-P4 in the manner shown in FIG. 11D. More particularly, the voltages $V_1$, $V_2$, $V_3$, and V4 at bond pads P1, P2, P3, and P4 are negative. The first reader 1102, the contact sensor 1104, and the second reader 1105 are inactive due to the negative voltages of substantially equal magnitude at bond pads P1, P2, P3, and P4. Given the negative voltage $V_3$ at bond pad P3 relative to the voltage $V_g$ at the ground pad 1120, the first diode 1110 is reversed bias, thereby preventing current flow through the first writer heater 1106. The second writer heater 1108 is energized due to the voltage drop between the ground pad 1120 and the bond pad P1, which is sufficient to forward bias the second diode 1114.

Figure 11E:
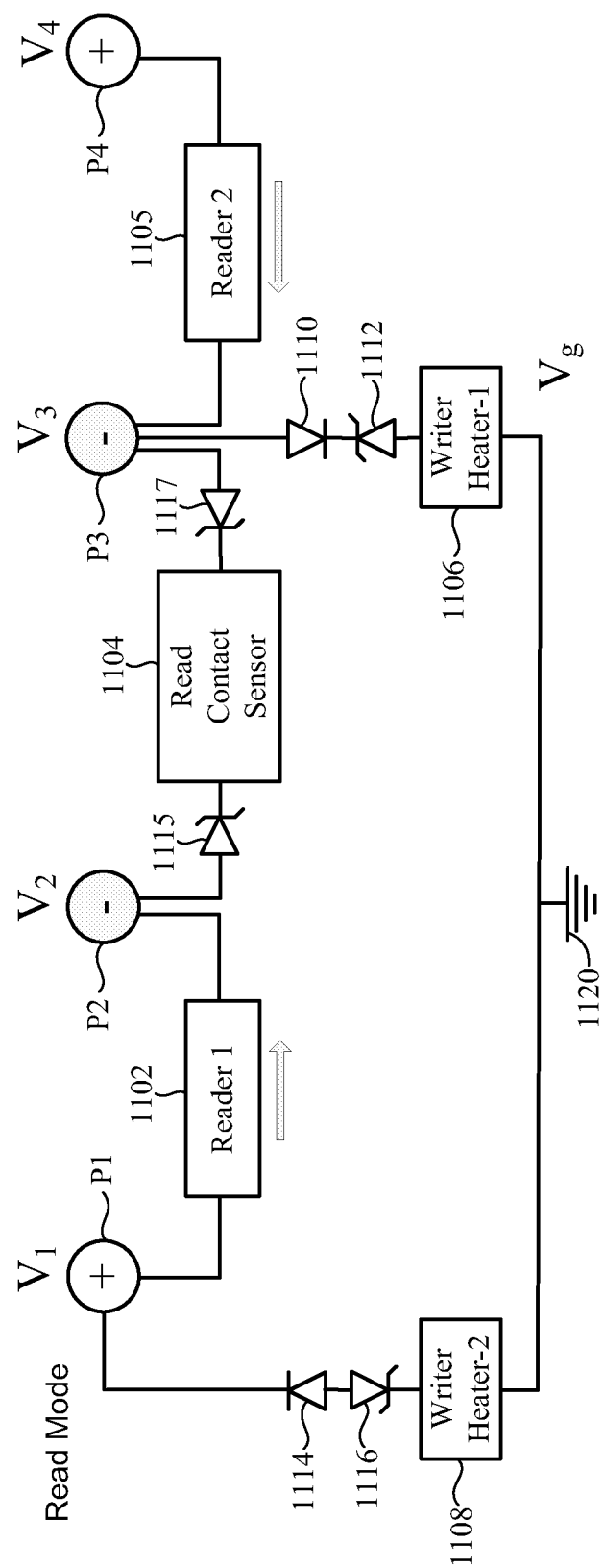

As was discussed previously, in some slider designs, the contact sensor 1104 can generate noise while the readers 1102 and 1105 are active during a read mode. If contact sensor noise is an issue during read mode operation, Zener diodes can be incorporated into the circuit as shown in FIG. 11E. A third Zener diode 1115 is coupled between a first end of the contact sensor 1104 and the second bond pad, P2. A fourth Zener diode 1117 is coupled between a second end of the contact sensor 1104 and the third bond pad, P3. The Zener diodes 1115 and 1117 have a sufficiently high reverse bias threshold to prevent flow of any signal from the contact sensor 1104 to the readers 1102 and 1105 during read mode operation.

Figure 12C:
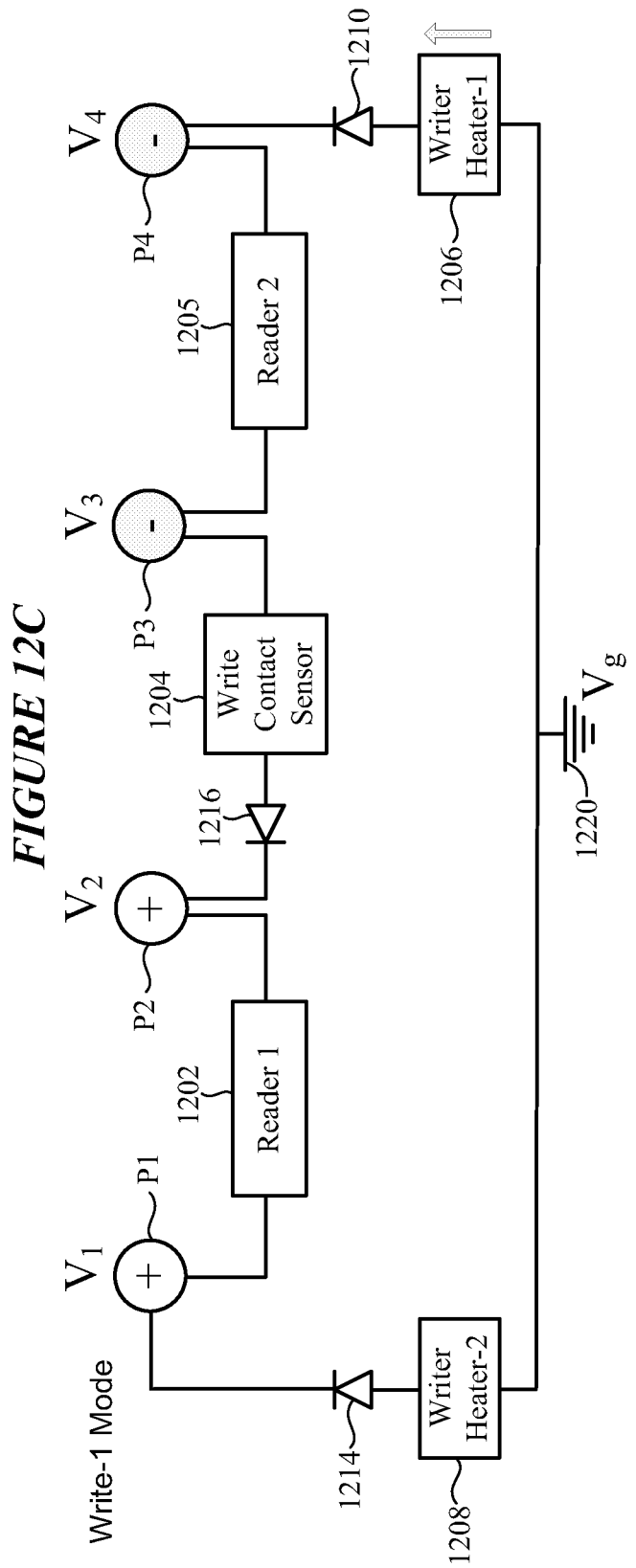

FIGS. 12A-12C illustrate circuits that support bond pad sharing between a multiplicity of components of a slider in accordance with various embodiments. In particular, FIGS. 12A-12C illustrate circuitry configured to facilitate bond pad sharing between a first reader 1202, a second reader 1205, a write contact sensor 1204, a first writer heater 1206, and a second writer heater 1208. The bond pad sharing arrangement shown in FIGS. 12A-12C is of particular usefulness in recording heads configured for IMR and TDMR/MSMR.

In FIGS. 12A-12C, the first reader 1202 is coupled between bond pads P1 and P2, the contact sensor 1204 is coupled between bond pads P2 and P3, the second reader 1205 is coupled between bond pads P3 and P4, the first writer heater 1205 is coupled between bond pad P4 and the ground pad 1220, and the second writer heater 1208 is coupled between bond pad P1 and the ground pad 1220. In the embodiments shown in FIGS. 12A-12C, the contact sensor 1204 is configured as a write contact sensor, which is situated at or near a writer close point of the slider.

A cathode of a first diode 1210 is coupled to bond pad P4, and an anode of the first diode 1210 is coupled to the first writer heater 1206. A cathode of a second diode 1214 is coupled to bond pad P1, and an anode of the second diode 1214 is coupled to the second writer heater 1208. A cathode of a third diode 1216 is coupled to bond pad P2, and an anode of the third diode 1216 is coupled to the contact sensor 1204. It is noted that a Zener diode can be added between the contact sensor 1204 and each of the bond pads P2 and P3 to enhance noise immunity of the circuit during read mode operations of the first and second readers 1202 and 1205.

FIG. 12A shows the circuit operating in a read mode. In a read mode, the first and second readers 1202 and 1205 are active, and the contact sensor 1204, the first writer heater 1206, and the second writer heater 1208 are inactive. This can be achieved by biasing the bond pads P1-P4 in the manner shown in FIG. 12A. Accordingly, the first and second diodes 1210 and 1214 are reversed biased, preventing current flow through the first and second writer heaters 1206 and 1208. Because $V_2=V_3$, no current flows through the third diode 1216 and the contact sensor 1204 during the read mode.

FIG. 12B shows the circuit operating in a second writer mode, which is also a contact detection mode. In this mode, the contact sensor 1204 and the second writer heater 1208 are active, and the first reader 1202, the second reader 1205, and the first writer heater 1206 are inactive. This can be achieved by biasing the bond pads P1-P4 in the manner shown in FIG. 12B. Accordingly, the first diode 1210 is reversed biased, preventing current flow through the first writer heater 1206, and the second diode 1214 is forward biased, allowing current flow through the second writer heater 1208. Because $V_3>V_2$, the third diode 1216 is forward biased and current flows through the contact sensor 1204.

FIG. 12C shows the circuit operating in a first writer mode. In this mode, the first writer heater 1206 is active, and the contact sensor 1204, the first reader 1202, the second reader 1205, and the second writer heater 1208 are inactive. This can be achieved by biasing the bond pads P1-P4 in the manner shown in FIG. 12C. Accordingly, the first diode 1210 is forward biased, allowing current flow through the first writer heater 1206, and the second diode 1214 is reversed biased, preventing current flow through the second writer heater 1208. Because the third diode 1216 is reversed biased, no current flows through the contact sensor 1204 during the first writer mode.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider of a magnetic recording head comprising a ground pad and a plurality of electrical bond pads coupled to bias sources, the plurality of electrical bond pads including a plurality of shared bond pads;
a first component of the slider coupled to a first bond pad and one of the shared bond pads;
one or more additional components of the slider each coupled to a respective pair of the shared bond pads;
a first ground-coupled component of the slider coupled between one of the shared bond pads and the ground pad; and
a first diode disposed on the slider and coupled in series with the first ground-coupled component.

2. The apparatus of claim 1, further comprising a first Zener diode disposed on the slider and coupled between the first diode and the ground pad.

3. The apparatus of claim 1, wherein:
the first component comprises a reader;
the one or more additional components comprise a contact sensor situated proximate the reader; and
the first ground-coupled component comprises a writer heater configured to thermally actuate a writer of the slider.

4. The apparatus of claim 3, wherein:
the contact sensor comprises a first end coupled to a first shared bond pad and a second end coupled to a second shared bond pad;
a third Zener diode is coupled between the first end of the contact sensor and the first shared bond pad; and
a fourth Zener diode is coupled between the second end of the contact sensor and the second shared bond pad.

5. The apparatus of claim 1, wherein:
the first component comprises a contact sensor situated proximate a writer of the slider;
the one or more additional components comprise a bolometer; and
the first ground-coupled component comprises a reader heater configured to thermally actuate a reader of the slider.

6. The apparatus of claim 5, wherein:
the contact sensor comprises a first end coupled to the first bond pad and a second end coupled to a first shared bond pad;
a third Zener diode is coupled between the first end of the contact sensor and the first bond pad; and
a fourth Zener diode is coupled between the second end of the contact sensor and the first shared bond pad.

7. The apparatus of claim 1, wherein:
the first component comprises a first reader;
the one or more additional components comprise a second reader; and
the first ground-coupled component comprises a writer heater configured to thermally actuate a writer of the slider.

8. The apparatus of claim 1, wherein:
the first component comprises a first reader;
the one or more additional components comprise:
a contact sensor; and
a second reader, the contact sensor situated proximate the first reader or the second reader; and
the first ground-coupled component comprises a writer heater configured to thermally actuate a writer of the slider.

9. The apparatus of claim 8, wherein:
the contact sensor comprises a first end and a second end;
a third Zener diode is coupled between the first end of the contact sensor and the shared bond pad to which the first reader is coupled;
a fourth Zener diode is coupled between the second end of the contact sensor and a first shared bond pad to which the second reader is coupled; and
the first ground-coupled component is coupled to a second shared bond pad to which the second reader is coupled.

10. The apparatus of claim 1, further comprising:
a second ground-coupled component of the slider coupled between the first bond pad and the ground pad; and
a second diode disposed on the slider and coupled in series with the second ground-coupled component.

11. The apparatus of claim 10, further comprising:
a first Zener diode disposed on the slider and coupled between the first diode and the ground pad; and
a second Zener diode disposed on the slider and coupled between the second diode and the ground pad.

12. The apparatus of claim 10, wherein:
the first component comprises a contact sensor;
the one or more additional components comprise a reader, the contact sensor situated proximate the reader;
the first ground-coupled component comprises a first writer heater configured to thermally actuate a first writer of the slider; and
the second ground-coupled component comprises a second writer heater configured to thermally actuate a second writer of the slider.

13. The apparatus of claim 12, wherein:
the contact sensor comprises a first end coupled to the first bond pad and a second end coupled to the shared bond pad to which the reader is coupled; and
a third Zener diode is coupled between the second end of the contact sensor and the shared bond pad to which the reader is coupled.

14. The apparatus of claim 1, wherein:
the first component comprises a first reader;
the one or more additional components comprise:
a contact sensor; and
a second reader, the contact sensor situated proximate the first reader or the second reader; and
the first ground-coupled component comprises a first writer heater configured to thermally actuate a first writer of the slider, the first writer heater coupled to the shared bond pad to which the contact sensor and the second reader are coupled;
the apparatus further comprising:
a second writer heater coupled between the first bond pad and the ground pad, the second writer heater configured to thermally actuate a second writer of the slider; and
a second diode disposed on the slider and coupled in series with the second writer heater.

15. The apparatus of claim 14, further comprising:
a first Zener diode disposed on the slider and coupled between the first diode and the ground pad; and
a second Zener diode disposed on the slider and coupled between the second diode and the ground pad.

16. The apparatus of claim 14, wherein:
the contact sensor comprises a first end and a second end;
a third Zener diode is coupled between the first end of the contact sensor and the shared bond pad to which the first reader is coupled; and
a fourth Zener diode is coupled between the second end of the contact sensor and the shared bond pad to which the second reader is coupled.

17. An apparatus, comprising:
a slider of a magnetic recording head comprising a ground pad and a plurality of electrical bond pads coupled to bias sources, the plurality of electrical bond pads including a plurality of shared bond pads;
a first reader of the slider coupled to a first bond pad and one of the shared bond pads;
a second reader of the slider coupled to a pair of the shared bond pads;
a first writer heater of the slider coupled between one of the shared bond pads and the ground pad; and
a first diode disposed on the slider and coupled in series with the first writer heater.

18. The apparatus of claim 17, further comprising a first Zener diode disposed on the slider and coupled between the first diode and the ground pad.

19. The apparatus of claim 17, further comprising:
a contact sensor coupled between the shared bond pad to which the first reader is coupled and one of the shared bond pads to which the second reader is coupled;
wherein the contact sensor is situated at a close point of the first reader or the second reader.

20. The apparatus of claim 19, wherein:
the contact sensor comprises a first end and a second end;
a third Zener diode is coupled between the first end of the contact sensor and the shared bond pad to which the first reader is coupled; and
a fourth Zener diode is coupled between the second end of the contact sensor and the one of the shared bond pads to which the second reader is coupled.

21. The apparatus of claim 17, further comprising:
a contact sensor coupled between the shared bond pad to which the first reader is coupled and one of the shared bond pads to which the second reader is coupled;
a second writer heater of the slider coupled between the first bond pad and the ground pad; and
a second diode disposed on the slider and coupled in series with the second writer heater;
wherein the first writer heater is coupled to the shared bond pad to which the contact sensor and the second reader are coupled.

22. The apparatus of claim 21, further comprising a second Zener diode disposed on the slider and coupled between the second diode and the ground pad.

23. The apparatus of claim 21, wherein:
the contact sensor comprises a first end and a second end;

a third Zener diode is coupled between the first end of the contact sensor and the shared bond pad to which the first reader is coupled;

a fourth Zener diode is coupled between the second end of the contact sensor and the shared bond pad to which the second reader is coupled.

24. An apparatus, comprising:

a slider of a magnetic recording head comprising a ground pad and a plurality of electrical bond pads coupled to bias sources, the plurality of electrical bond pads including a plurality of shared bond pads;

a reader of the slider coupled between a first bond pad and one of the shared bond pads;

a contact sensor of the slider coupled to a pair of the shared bond pads;

a writer heater of the slider coupled between one of the shared bond pads and the ground pad; and a diode disposed on the slider and coupled in series with the writer heater.

25. The apparatus of claim 24, further comprising a Zener diode disposed on the slider and coupled between the diode and the ground pad.

* * * * *